(12) United States Patent
Zhang et al.

(10) Patent No.: US 12,501,042 B2
(45) Date of Patent: Dec. 16, 2025

(54) VIDEO DECODER INITIALIZATION INFORMATION SIGNALING

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Zhipin Deng, Beijing (CN); Na Zhang, Beijing (CN); Yang Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 95 days.

(21) Appl. No.: 18/447,861

(22) Filed: Aug. 10, 2023

(65) Prior Publication Data

US 2023/0388495 A1    Nov. 30, 2023

Related U.S. Application Data

(63) Continuation of application No. PCT/CN2022/075482, filed on Feb. 8, 2022.

(30) Foreign Application Priority Data

Feb. 10, 2021    (WO) ................ PCT/CN2021/076469

(51) Int. Cl.
*H04N 19/119*    (2014.01)
*H04N 19/172*    (2014.01)
(Continued)

(52) U.S. Cl.
CPC ......... *H04N 19/119* (2014.11); *H04N 19/172* (2014.11); *H04N 19/176* (2014.11); *H04N 19/184* (2014.11); *H04N 19/96* (2014.11)

(58) Field of Classification Search
CPC .... H04N 19/96; H04N 19/119; H04N 19/176; H04N 19/70
See application file for complete search history.

(56) References Cited

U.S. PATENT DOCUMENTS

2018/0367818 A1    12/2018    Liu
2021/0006786 A1*    1/2021    Gao ..................... H04N 19/176

FOREIGN PATENT DOCUMENTS

WO    2016191161 A1    12/2016
WO    2018129322 A1    7/2018
(Continued)

OTHER PUBLICATIONS

Document: JVET-K0287-v1, Gao, H., et al., "CE1-2.0.11: Picture Boundary Handling," Joint Video Experts Team (JVET) of ITU-T SG 16 WP 3 and ISO/IEC JTC 1/SC 29/WG 11 11th Meeting: Ljubljana, SI, Jul. 10-18, 2018, 7 pages.
(Continued)

*Primary Examiner* — Nam D Pham
(74) *Attorney, Agent, or Firm* — Conley Rose, P.C.

(57) ABSTRACT

A mechanism for processing video data is disclosed. A parent block is partitioned with an Extended Ternary-Tree (ETT) partition to create three sub-blocks. At least one of the sub-blocks includes a side with a measurement that is not a power of two. A conversion is performed between a visual media data and a bitstream based on the sub-blocks.

13 Claims, 17 Drawing Sheets

(51) Int. Cl.
*H04N 19/176* (2014.01)
*H04N 19/184* (2014.01)
*H04N 19/96* (2014.01)

(56) References Cited

FOREIGN PATENT DOCUMENTS

| WO | 2018177953 | A1 | 10/2018 |
| WO | 2019083394 | A1 | 5/2019 |
| WO | 2019225991 | A1 | 11/2019 |

OTHER PUBLICATIONS

Sullivan, G., et al., "Overview of the High Efficiency Video Coding (HEVC) Standard," IEEE Transactions on Circuits and Systems for Video Technology, vol. 22, No. 12, Dec. 2012, 20 pages.

Luthra, A., et al., "Overview of the H.264/AVC video coding standard," Proceedings of SPIE vol. 5203 Applications of Digital Image Processing XXVI, doi: 10.1117/12.512557, Nov. 19, 2003, 16 pages.

Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

JEM-7.0: https://jvet.hhi.fraunhofer.de/svn/svn_HMJEMSoftware/tags/ HM-16.6-JEM-7.0, Nov. 8, 2023, 1 page.

Series H: Audiovisual and Multimedia Systems Infrastructure of audiovisual services—Coding of moving video High efficiency video coding, Recommendation ITU-T H.265, Nov. 2019, 712 pages.

Document: JVET-D0117r1, Li, X., et al., "Multi-Type-Tree," Joint Video Exploration Team (JVET) of ITU-T SG 16 WP 3 and ISO/IEC JTC 1/SC 29/WG 11 4th Meeting: Chengdu, CN, Oct. 15-21, 2016, 3 pages.

Document: JVET-J1001-v2, "Versatile Video Coding (Draft 1)," Joint Video Experts Team (JVET) of ITU-T SG 16 WP 3 and ISO/IEC JTC 1/SC 29/WG 11 10th Meeting: San Diego, US, Apr. 10-20, 2018, 43 pages.

International Search Report from PCT Application No. PCT/CN2022/075482 dated Apr. 26, 2022, 10 pages.

\* cited by examiner

— 1 —

VIDEO DECODER INITIALIZATION INFORMATION SIGNALING

CROSS-REFERENCE TO RELATED APPLICATIONS

This application is a continuation of International Patent Application No. PCT/CN2022/075482, filed on Feb. 8, 2022, which claims the priority to and benefits of International Patent Application No. PCT/CN2021/076469, filed on Feb. 10, 2021. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: partitioning a parent block with an Extended Ternary-Tree (ETT) partition to create three sub-blocks, wherein at least one of the sub-blocks comprises a side with a measurement that is not a power of two; and performing a conversion between a visual media data and a bitstream based on the sub-blocks.

Optionally, in any of the preceding aspects, another implementation of the aspect provides that the parent block includes a width (W) and a height (H), wherein the three sub-blocks include a proximate sub-block with a width (W1) and a height (H1), a middle sub-block with a width (W2) and a height (H2), and a distal sub-block with a width (W3) and a height (H3), and wherein W, W1, W2, W3, H, H1, H2, and H3 are all integers.

Optionally, in any of the preceding aspects, another implementation of the aspect provides that W2 cannot be expressed in a form of $W2=2^{N2}$ where N2 is a positive integer, or wherein H2 cannot be expressed in a form of $H2=2^{N2}$ where N2 is an integer.

Optionally, in any of the preceding aspects, another implementation of the aspect provides that W1 is a power of two or H1 is a power of two.

Optionally, in any of the preceding aspects, another implementation of the aspect provides that the ETT partition is a vertical ETT partition (ETT-V), wherein the three sub-blocks have a collective width equal to the width of the parent block, and wherein the three sub-blocks each have a height equal to the height of the parent block.

Optionally, in any of the preceding aspects, another implementation of the aspect provides that W1 is equal to $\frac{1}{8}*W$, wherein W2 is equal to $\frac{3}{4}*W$, and wherein W3 is equal to $\frac{1}{8}*W$.

Optionally, in any of the preceding aspects, another implementation of the aspect provides that the three sub-blocks are coded in a coding order from left to right.

Optionally, in any of the preceding aspects, another implementation of the aspect provides that the ETT partition is a horizontal ETT partition (ETT-V), wherein the three sub-blocks have a collective height equal to the height of the parent block, and wherein the three sub-blocks each have a width equal to the width of the parent block.

Optionally, in any of the preceding aspects, another implementation of the aspect provides that H1 is equal to $\frac{1}{8}*H$, wherein H2 is equal to $\frac{3}{4}*H$, and wherein H3 is equal to $\frac{1}{8}*H$.

Optionally, in any of the preceding aspects, another implementation of the aspect provides that the three sub-blocks are coded in a coding order from top to bottom.

Optionally, in any of the preceding aspects, another implementation of the aspect provides that the ETT partition is allowed only allowed when a side of the parent block is a power of two.

Optionally, in any of the preceding aspects, another implementation of the aspect provides that an indication of the ETT partition is included in a bitstream only when the ETT partition is allowed.

Optionally, in any of the preceding aspects, another implementation of the aspect provides that two of the sub-blocks have a same width and one of the sub-blocks has a different width or wherein two of the sub-blocks have a same height and one of the sub-blocks has a different height.

Optionally, in any of the preceding aspects, another implementation of the aspect provides that all of the sub-blocks have different widths or wherein all of the sub-blocks have different heights.

Optionally, in any of the preceding aspects, another implementation of the aspect provides determining whether a rule allows or forces partitioning the sub-blocks based on the ETT partition of the parent block, indices of the sub-blocks, and sizes of the sub-blocks.

Optionally, in any of the preceding aspects, another implementation of the aspect provides that the rule forces partitioning of the middle sub-block when the parent block is partitioned by ETT.

Optionally, in any of the preceding aspects, another implementation of the aspect provides that the middle sub-block is forced to be partitioned when the middle sub-block is larger than a threshold and when the middle sub-block contains luma samples.

Optionally, in any of the preceding aspects, another implementation of the aspect provides that the middle sub-block is not allowed to be partitioned by a horizontal split when the ETT is an ETT-V, and wherein the middle sub-block is not partitioned by a vertical split when the ETT is an ETT-H.

Optionally, in any of the preceding aspects, another implementation of the aspect provides that the middle sub-block is vertically partitioned into two child sub-blocks when the ETT is an ETT-V, and wherein the middle sub-block is horizontally partitioned into two child sub-blocks when the ETT is an ETT-H.

Optionally, in any of the preceding aspects, another implementation of the aspect provides that the ETT partition is inferred from a predefined value when a codeword for the ETT partition is not signaled in a bitstream.

Optionally, in any of the preceding aspects, another implementation of the aspect provides that the ETT partition is performed only when a height of the parent block is larger than a minimum height threshold and when a width of the parent block is larger than a minimum width threshold.

A second aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present document, editing changes are shown to text by bold italics indicating cancelled text and bold underline indicating added text, with respect to the VVC specification or International Organization for Standardization (ISO) base media file format (ISOBMFF) file format specification.

This document is related to image/video coding, and more particularly to the partition structure used in video coding. Partitioning includes mechanisms that split one large block to smaller blocks. The disclosed mechanisms may be applied to the video coding standards such as High Efficiency Video Coding (HEVC) and/or Versatile Video Coding (VVC). Such mechanisms may also be applicable to other video coding standards and/or video codecs.

Video coding standards have evolved primarily through the development of the International Telecommunication Union (ITU) Telecommunication Standardization Sector (ITU-T) and International Organization for Standardization (ISO)/International Electrotechnical Commission (IEC) standards. The ITU-T produced a H.261 standard and a H.263 standard, ISO/IEC produced Motion Picture Experts Group (MPEG) phase one (MPEG-1) and MPEG phase four (MPEG-4) Visual standards, and the two organizations jointly produced the H.262/MPEG phase two (MPEG-2) Video standard, the H.264/MPEG-4 Advanced Video Coding (AVC) standard, and the H.265/High Efficiency Video Coding (HEVC) standard. Since H.262, the video coding standards are based on a hybrid video coding structure that utilizes a temporal prediction plus a transform coding.

Figure 1:
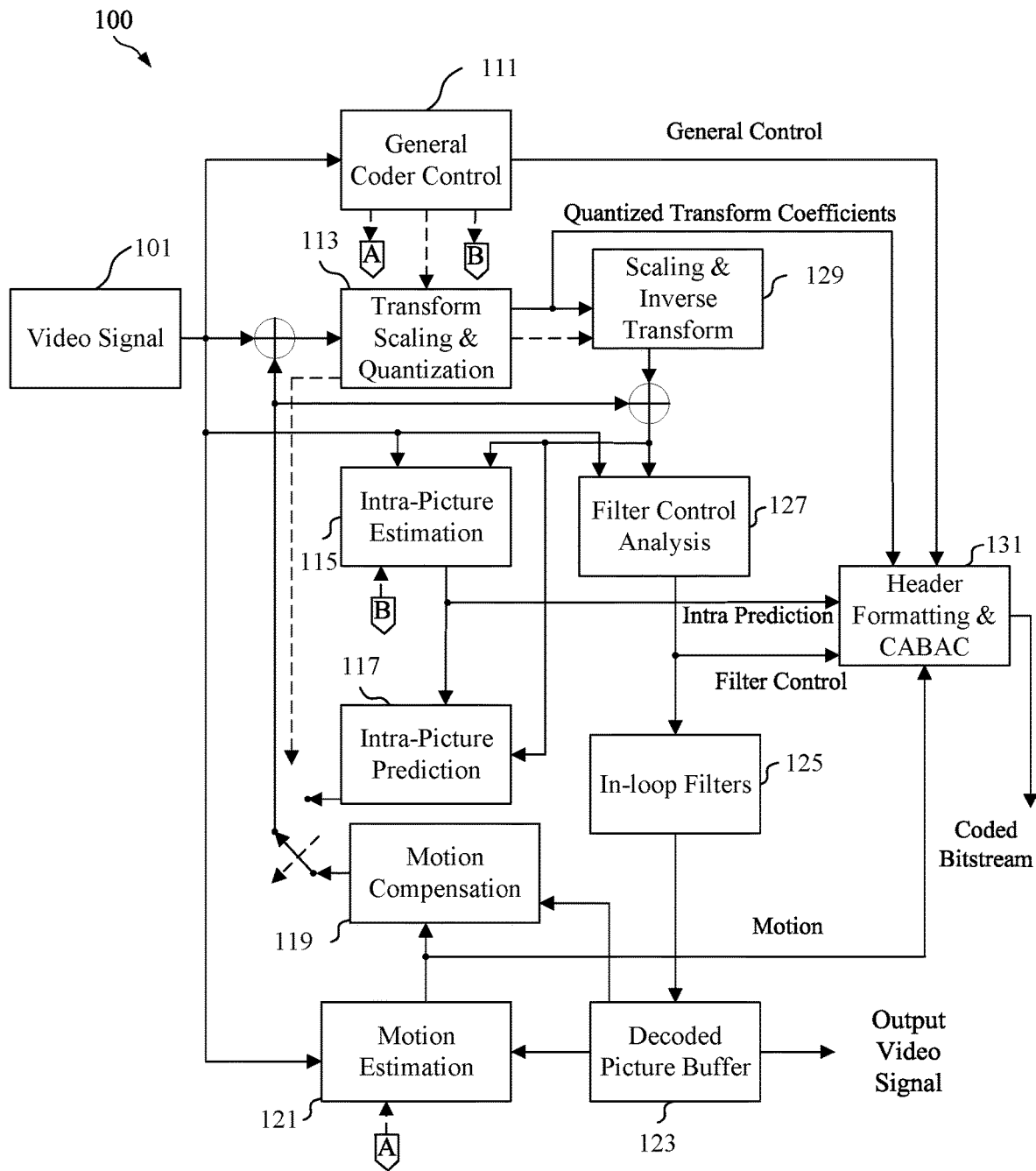
FIG. 1 is a schematic diagram of an example coding and decoding (codec) for video coding.

FIG. 1 is a schematic diagram of an example coding and decoding (codec) for video coding, for example according to HEVC. For example, codec 100 provides functionality to support converting a video file into a bitstream by encoding and/or decoding pictures. Codec 100 is generalized to depict components employed in both an encoder and a decoder. Codec 100 receives a stream of pictures as a video signal 101 and partitions the pictures. Codec 100 then compresses the pictures in the video signal 101 into a coded bitstream when acting as an encoder. When acting as a decoder, codec system 100 generates an output video signal from the bitstream. The codec 100 includes a general coder control component 111, a transform scaling and quantization component 113, an intra-picture estimation component 115, an intra-picture prediction component 117, a motion compensation component 119, a motion estimation component 121, a scaling and inverse transform component 129, a filter control analysis component 127, an in-loop filters component 125, a decoded picture buffer component 123, and a header formatting and context adaptive binary arithmetic coding (CABAC) component 131. Such components are coupled as shown. In FIG. 1, black lines indicate movement of data to be encoded/decoded while dashed lines indicate movement of control data that controls the operation of other components. The components of codec 100 may all be present in the encoder. The decoder may include a subset of the components of codec 100. For example, the decoder may include the intra-picture prediction component 117, the motion compensation component 119, the scaling and inverse transform component 129, the in-loop filters component 125, and the decoded picture buffer component 123. These components are now described.

The video signal 101 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The video signal 101 is forwarded to the general coder control component 111, the transform scaling and quantization component 113, the intra-picture estimation component 115, the filter control analysis component 127, and the motion estimation component 121 for compression.

The general coder control component 111 is configured to make decisions related to coding of the images of the video sequence into the bitstream according to application constraints. For example, the general coder control component 111 manages optimization of bitrate/bitstream size versus reconstruction quality. Such decisions may be made based on storage space/bandwidth availability and image resolution requests. The general coder control component 111 also manages buffer utilization in light of transmission speed to mitigate buffer underrun and overrun issues. To manage these issues, the general coder control component 111 manages partitioning, prediction, and filtering by the other components. For example, the general coder control component 111 may increase compression complexity to increase resolution and increase bandwidth usage or decrease compression complexity to decrease resolution and bandwidth usage. Hence, the general coder control component 111 controls the other components of codec 100 to balance video signal reconstruction quality with bit rate concerns. The general coder control component 111 creates control data, which controls the operation of the other components. The control data is also forwarded to the header formatting and CABAC component 131 to be encoded in the bitstream to signal parameters for decoding at the decoder.

The video signal 101 is also sent to the motion estimation component 121 and the motion compensation component 119 for inter-prediction. A video unit (e.g., a picture, a slice, a CTU, etc.) of the video signal 101 may be divided into multiple blocks. Motion estimation component 121 and the motion compensation component 119 perform inter-predictive coding of the received video block relative to one or more blocks in one or more reference pictures to provide temporal prediction. Codec system 100 may perform multiple coding passes, e.g., to select an appropriate coding mode for each block of video data.

Motion estimation component 121 and motion compensation component 119 may be highly integrated, but are illustrated separately for conceptual purposes. Motion estimation, performed by motion estimation component 121, is the process of generating motion vectors, which estimate motion for video blocks. A motion vector, for example, may indicate the displacement of a coded object in a current block relative to a reference block. A reference block is a block that is found to closely match the block to be coded, in terms of pixel difference. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 121 generates motion vectors, PUs, and TUs by using a rate-distortion analysis as part of a rate distortion optimization process. For example, the motion estimation component 121 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec 100 may calculate values for sub-integer pixel positions of reference pictures stored in decoded picture buffer component 123. For example, video codec 100 may interpolate values of one-quarter pixel positions, one-eighth pixel positions, or other fractional pixel positions of the reference picture. Therefore, motion estimation component 121 may perform a motion search relative to the full pixel positions and fractional pixel positions and output a motion vector with fractional pixel precision. The motion estimation component 121 calculates a motion vector for a PU of a video block in an inter-coded slice by comparing the position of the PU to the position of a reference block of a reference picture. Motion estimation component 121 outputs the calculated motion vector as motion data to header formatting and CABAC component 131 for encoding and to the motion compensation component 119.

Motion compensation, performed by motion compensation component 119, may involve fetching or generating a reference block based on the motion vector determined by motion estimation component 121. Motion estimation component 121 and motion compensation component 119 may be functionally integrated, in some examples. Upon receiving the motion vector for the PU of the current video block, motion compensation component 119 may locate the reference block to which the motion vector points. A residual video block is then formed by subtracting pixel values of the reference block from the pixel values of the current block being coded, forming pixel difference values. In general, motion estimation component 121 performs motion estimation relative to luma components, and motion compensation component 119 uses motion vectors calculated based on the luma components for both chroma components and luma components. The reference block and residual block are forwarded to transform scaling and quantization component 113.

The video signal 101 is also sent to intra-picture estimation component 115 and intra-picture prediction component 117. As with motion estimation component 121 and motion compensation component 119, intra-picture estimation component 115 and intra-picture prediction component 117 may be highly integrated, but are illustrated separately for conceptual purposes. The intra-picture estimation component 115 and intra-picture prediction component 117 intra-predict a current block relative to blocks in a current picture, as an alternative to the inter-prediction performed by motion estimation component 121 and motion compensation component 119 between pictures, as described above. In particular, the intra-picture estimation component 115 determines an intra-prediction mode to use to encode a current block. In some examples, intra-picture estimation component 115 selects an appropriate intra-prediction mode to encode a current block from multiple tested intra-prediction modes. The selected intra-prediction modes are then forwarded to the header formatting and CABAC component 131 for encoding.

For example, the intra-picture estimation component 115 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 115 calculates ratios from the distortions and rates for the various encoded blocks to determine which intra-prediction mode exhibits the best rate-distortion value for the block. In addition, intra-picture estimation component 115 may be configured to code depth blocks of a depth map using a depth modeling mode (DMM) based on rate-distortion optimization (RDO).

The intra-picture prediction component 117 may generate a residual block from the reference block based on the selected intra-prediction modes determined by intra-picture estimation component 115 when implemented on an encoder or read the residual block from the bitstream when implemented on a decoder. The residual block includes the difference in values between the reference block and the original block, represented as a matrix. The residual block is then forwarded to the transform scaling and quantization component 113. The intra-picture estimation component 115 and the intra-picture prediction component 117 may operate on both luma and chroma components.

The transform scaling and quantization component 113 is configured to further compress the residual block. The transform scaling and quantization component 113 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 113 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 113 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 113 may then perform a scan of the matrix including the quantized transform coefficients. The quantized transform coefficients are forwarded to the header formatting and CABAC component 131 to be encoded in the bitstream.

The scaling and inverse transform component 129 applies a reverse operation of the transform scaling and quantization component 113 to support motion estimation. The scaling and inverse transform component 129 applies inverse scaling, transformation, and/or quantization to reconstruct the residual block in the pixel domain, e.g., for later use as a reference block for another current block. The motion estimation component 121 and/or motion compensation component 119 may calculate a further reference block by adding the residual block back to a previous reference block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 127 and the in-loop filters component 125 apply the filters to the residual blocks and/or to reconstructed picture blocks. For example, the transformed residual block from the scaling and inverse transform component 129 may be combined with a corresponding reference block from intra-picture prediction component 117 and/or motion compensation component 119 to reconstruct the original image block. The filters may then be applied to the reconstructed image block. In some examples, the filters may instead be applied to the residual blocks. As with other components in FIG. 1, the filter control analysis component 127 and the in-loop filters component 125 are highly integrated and may be implemented together, but are depicted separately for conceptual purposes. Filters applied to the reconstructed reference blocks are applied to particular spatial regions and include multiple parameters to adjust how such filters are applied. The filter control analysis component 127 analyzes the reconstructed reference blocks to determine where such filters should be applied and sets corresponding parameters. Such data is forwarded to the header formatting and CABAC component 131 as filter control data for encoding. The in-loop filters component 125 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 123 for later use in motion estimation as discussed above. When operating as a decoder, the decoded picture buffer component 123 stores and forwards the reconstructed and filtered blocks toward a display as part of an output video signal. The decoded picture buffer component 123 may be any memory device capable of storing prediction blocks, residual blocks, and/or reconstructed image blocks.

The header formatting and CABAC component 131 receives the data from the various components of codec 100 and encodes such data into a coded bitstream for transmission toward a decoder. Specifically, the header formatting and CABAC component 131 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 101. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 2:
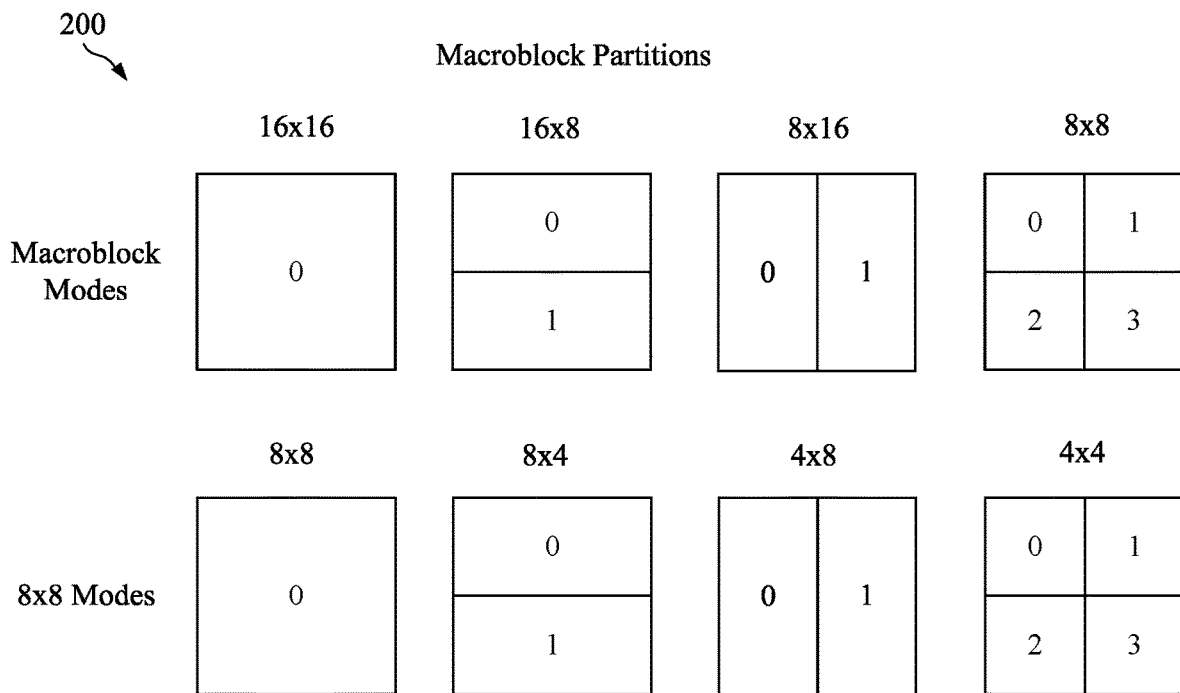
FIG. 2 is a schematic diagram of example macroblock partitions.

In order to encode and/or decode a picture as described above, the picture is first partitioned. FIG. 2 is a schematic diagram of example macroblock partitions 200, which can be created by a partition tree structure pursuant to H.264/AVC. The core of the coding layer in such standards is the macroblock, containing a 16×16 block of luma samples and, in the case of 4:2:0 color sampling, two corresponding 8×8 blocks of chroma samples. An intra-coded block uses spatial prediction to exploit spatial correlation among pixels. Two partitions are defined for an intra-coded block, namely a 16×16 sub-block and 4×4 sub-block. An inter-coded block uses temporal prediction, instead of spatial prediction, by estimating motion among pictures. Motion can be estimated independently for either a 16×16 macroblock or any sub-macroblock partitions. An inter-coded block can be partitioned into a 16×8 sub-block, an 8×16 sub-block, an 8×8 sub-block, an 8×4 sub-block, a 4×8 sub-block, and/or a 4×4 sub-block. All such values are measured in a number of samples. A Sample is a luma (light) value or chroma (color) value at a pixel.

Figure 3:
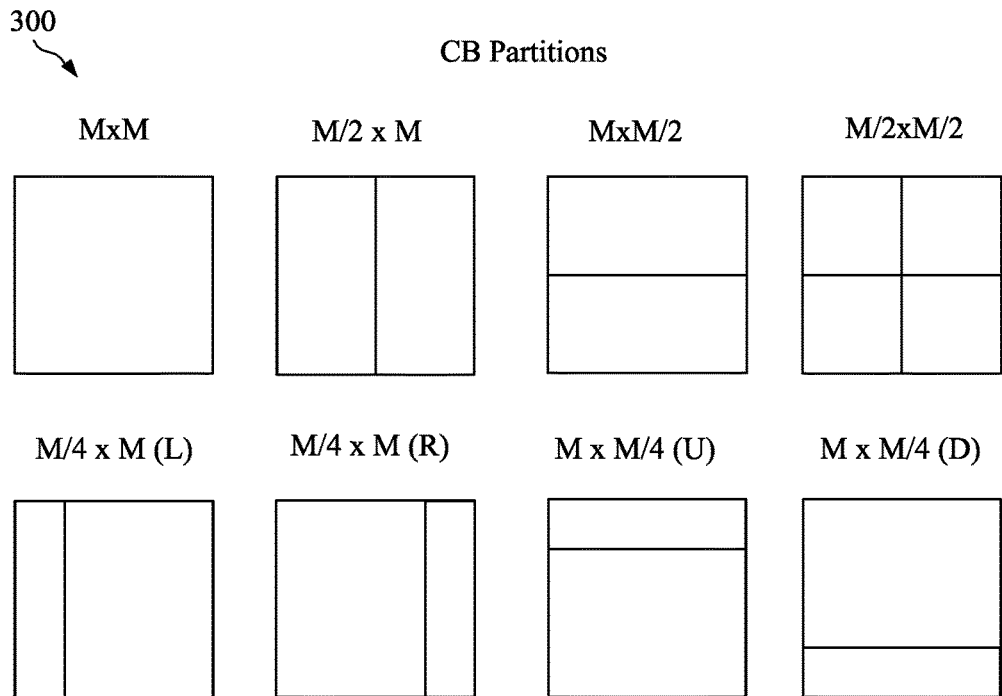
FIG. 3 is a schematic diagram of example modes for partitioning coding blocks, for example according to High Efficiency Video Coding (HEVC).

FIG. 3 is a schematic diagram of example modes 300 for partitioning coding blocks, for example according to HEVC. In HEVC, a picture is partitioned into CTUs. A CTU is split into CUs by using a quadtree structure denoted as a coding tree to adapt to various local characteristics. The decision whether to code a picture area using inter-picture (temporal) or intra-picture (spatial) prediction is made at the CU level. Each CU can be further split into one, two, or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One feature of the HEVC structure is that HEVC has multiple partition conceptions including CU, PU, and TU.

Various features involved in hybrid video coding using HEVC are highlighted as follows. HEVC includes the CTU, which is analogous to the macroblock in AVC. The CTU has a size selected by the encoder and can be larger than a macroblock. The CTU includes a luma coding tree block (CTB), corresponding chroma CTBs, and syntax elements. The size of a luma CTB, denoted as L×L, can be chosen as L=16, 32, or 64 samples with the larger sizes resulting in better compression. HEVC then supports a partitioning of the CTBs into smaller blocks using a tree structure and quadtree-like signaling.

The quadtree syntax of the CTU specifies the size and positions of corresponding luma and chroma CBs. The root of the quadtree is associated with the CTU. Hence, the size of the luma CTB is the largest supported size for a luma CB. The splitting of a CTU into luma and chroma CBs is signaled jointly. One luma CB and two chroma CBs, together with associated syntax, form a coding unit (CU). A CTB may contain only one CU or may be split to form multiple CUs. Each CU has an associated partitioning into prediction units (PUs) and a tree of transform units (TUs). The decision of whether to code a picture area using inter picture or intra picture prediction is made at the CU level. A PU partitioning structure has a root at the CU level. Depending on the basic prediction-type decision, the luma and chroma CBs can then be further split in size and predicted from luma and chroma prediction blocks (PBs) according to modes 300. HEVC supports variable PB sizes from 64×64 down to 4×4 samples. As shown, modes 300 can split a CB of size M pixels by M pixels into an M×M block, a M/2×M block, a M×M/2 block, a M/2×M/2 block, a M/4×M (left) block, a M/4×M (right) block, a M×M/4 (up) block, and/or a M×M/4 (down) block. It should be noted that the modes 300 for splitting CBs into PBs are subject to size constraints. Further, only M×M and M/2×M/2 are supported for intra picture predicted CBs.

Figure 4:
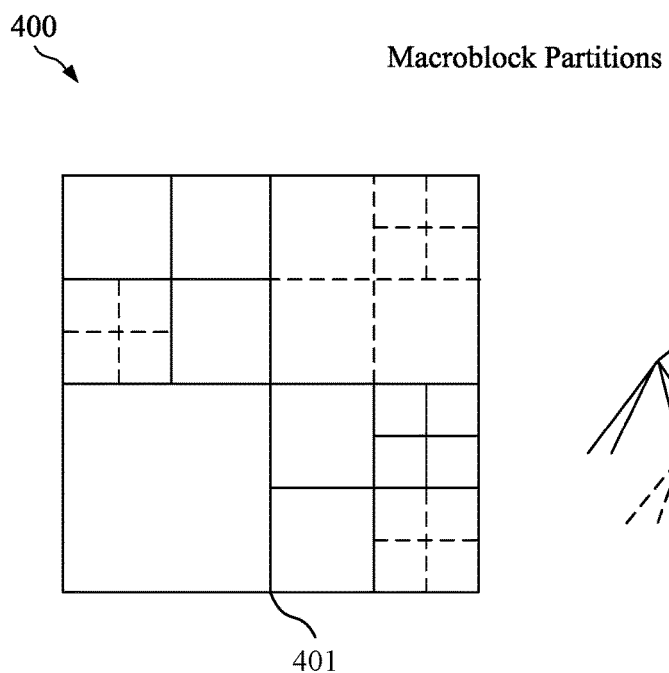
FIG. 4 is a schematic diagram of example method for partitioning a picture for coding residual.

FIG. 4 is a schematic diagram of example method 400 for partitioning a picture for coding residual, for example according to HEVC. As noted above, blocks are coded by reference to reference blocks. A difference between values of a current block and the reference blocks is known as the residual. Method 400 is employed to compress the residual. For example, the prediction residual is coded using block transforms. Method 400 employs a TU tree structure 403 to partition a CTB 401 and included CBs for application of transform blocks (TBs). Method 400 illustrates the subdivision of a CTB 401 into CBs and TBs. Solid lines indicate CB boundaries and dotted lines indicate TB boundaries. The TU tree structure 403 is an example quadtree that partitions the CTB 401. A transform, such as discrete cosine transform (DCT), is applied to each TB. The transform converts the residual into transform coefficients that can be represented using less data than the uncompressed residual. The TU tree structure 403 has a root at the CU level. The luma CB residual area may be identical to the luma TB area or may be further split into smaller luma TB s. The same applies to the chroma TBs. Integer basis transform functions similar to those of a DCT are defined for the square TB sizes 4×4, 8×8, 16×16, and 32×32. For the 4×4 transform of luma intra picture prediction residuals, an integer transform derived from a form of DST is alternatively specified.

A quadtree plus binary tree block structure with larger CTUs in Joint Exploration Model (JEM) is discussed below. Joint Video Exploration Team (JVET) was founded by Video Coding Experts group (VCEG) and MPEG to explore video coding technologies beyond HEVC. JVET has adopted many improvements included such improvements into a reference software named Joint Exploration Model (JEM).

Figure 5:
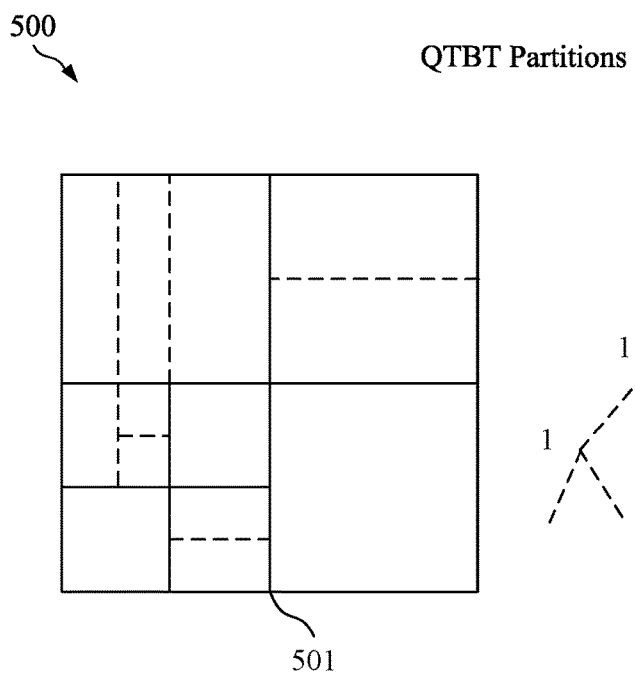
FIG. 5 is a schematic diagram of example method for partitioning a picture, for example according to a quad tree binary tree (QTBT) structure.

FIG. 5 is a schematic diagram of example method 500 for partitioning a picture, for example according to a quad tree binary tree (QTBT) structure 501. A tree representation 503 of the QTBT structure 501 is also shown. Unlike the partitioning structures in HEVC, the QTBT structure 501 removes the concepts of multiple partition types. For example, the QTBT structure 501 removes the separation of the CU, PU, and TU concepts, and supports more flexibility for CU partition shapes. In the QTBT structure 501, a CU can have either a square or rectangular shape. In method 500, a CTU is first partitioned by a quadtree structure. The quadtree leaf nodes are further partitioned by a binary tree structure. Symmetric horizontal splitting and symmetric vertical splitting are two splitting types used in the binary tree. The binary tree leaf nodes are called CUs, and that segmentation is used for prediction and transform processing without further partitioning. This causes the CU, PU, and TU to have the same block size in the QTBT structure 501. In the JEM, a CU sometimes includes CBs of different color components. For example, one CU may contain one luma CB and two chroma CBs in the case of unidirectional inter prediction (P) and bidirectional inter prediction (B) slices of the 4:2:0 chroma format. Further, the CU sometimes includes a CB of a single component. For example, one CU may contain only one luma CB or just two chroma CBs in the case of intra prediction (I) slices.

The following parameters are defined for the QTBT partitioning scheme. The CTU size is the root node size of a quadtree, which is the same concept as in HEVC. Minimum quad tree size (MinQTSize) is the minimum allowed quadtree leaf node size. Maximum binary tree size (MaxBTSize) is the maximum allowed binary tree root node size. Maximum binary tree depth (MaxBTDepth) is the maximum allowed binary tree depth. Minimum binary tree size (MinBTSize) is the minimum allowed binary tree leaf node size.

In one example of the QTBT structure 501, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (the MinQTSize) to 128×128 (the CTU size). If the leaf quadtree node is 128×128, the node is not to be further split by the binary tree since the size exceeds the MaxBTSize (e.g., 64×64). Otherwise, the leaf quadtree node can be further partitioned by the binary tree. Therefore, the quadtree leaf node is also the root node for the binary tree and has the binary tree depth as 0. When the binary tree depth reaches MaxBTDepth (e.g., 4), no further splitting is considered. When the binary tree node has width equal to MinBTSize (e.g., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

Method 500 illustrates an example of block partitioning by using the QTBT structure 501, and tree representation 503 illustrates the corresponding tree representation. The solid lines indicate quadtree splitting and dotted lines indicate binary tree splitting. In each splitting (e.g., non-leaf) node of the binary tree, one flag is signalled to indicate which splitting type (e.g., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure 501. For example, in P and B slices the luma and chroma CTBs in one CTU share the same QTBT structure 501. However, in I slices the luma CTB is partitioned into CUs by a QTBT structure 501, and the chroma CTBs are partitioned into chroma CUs by another QTBT structure 501. Accordingly, a CU in an I slice can include a coding block of the luma component or coding blocks of two chroma components. Further, a CU in a P or B slice includes coding blocks of all three color components. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

Figure 6:
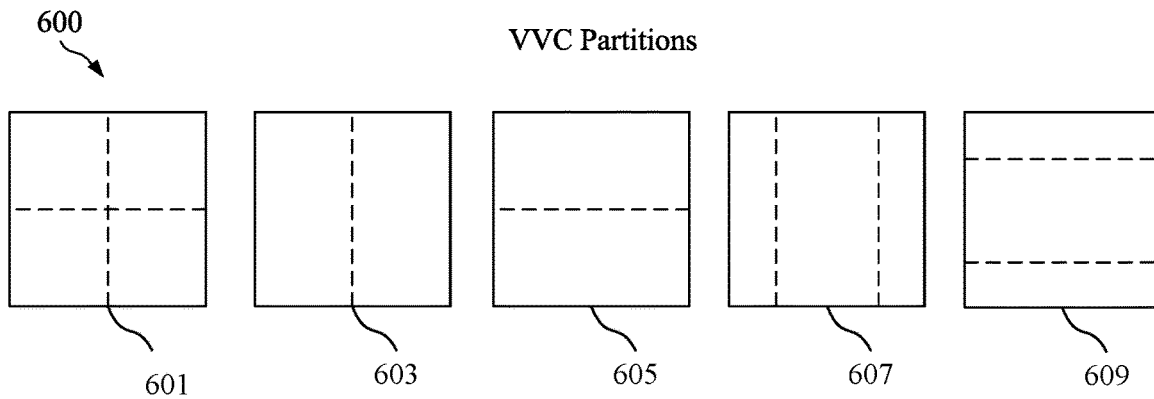
FIG. 6 is a schematic diagram of example partitioning structures used in Versatile Video Coding (VVC).

Triple-tree partitioning for VVC is now discussed. FIG. 6 is a schematic diagram 600 of example partitioning structures used in VVC. As shown, split types other than quad-tree and binary-tree are supported in VVC. For example, schematic diagram 600 includes a quad tree partition 601, a vertical binary tree partition 603, a horizontal binary tree partition 605, a vertical triple tree partition 607, and a horizontal triple tree partition 609. This approach introduces two triple tree (TT) partitions in addition to the quad tree and binary trees.

In an example implementation, two levels of trees are employed including a region tree (a quad-tree) and a prediction tree (binary-tree or triple-tree). A CTU is first partitioned by a region tree (RT). A RT leaf may be further split with prediction tree (PT). A PT leaf may also be further split with PT until a max PT depth is reached. A PT leaf is a basic coding unit. The PT may also be called a CU for convenience. In an example implementation, a CU cannot be further split. Prediction and transform are both applied on CU in the same way as JEM. The whole partition structure is named multiple-type-tree.

Figure 7:
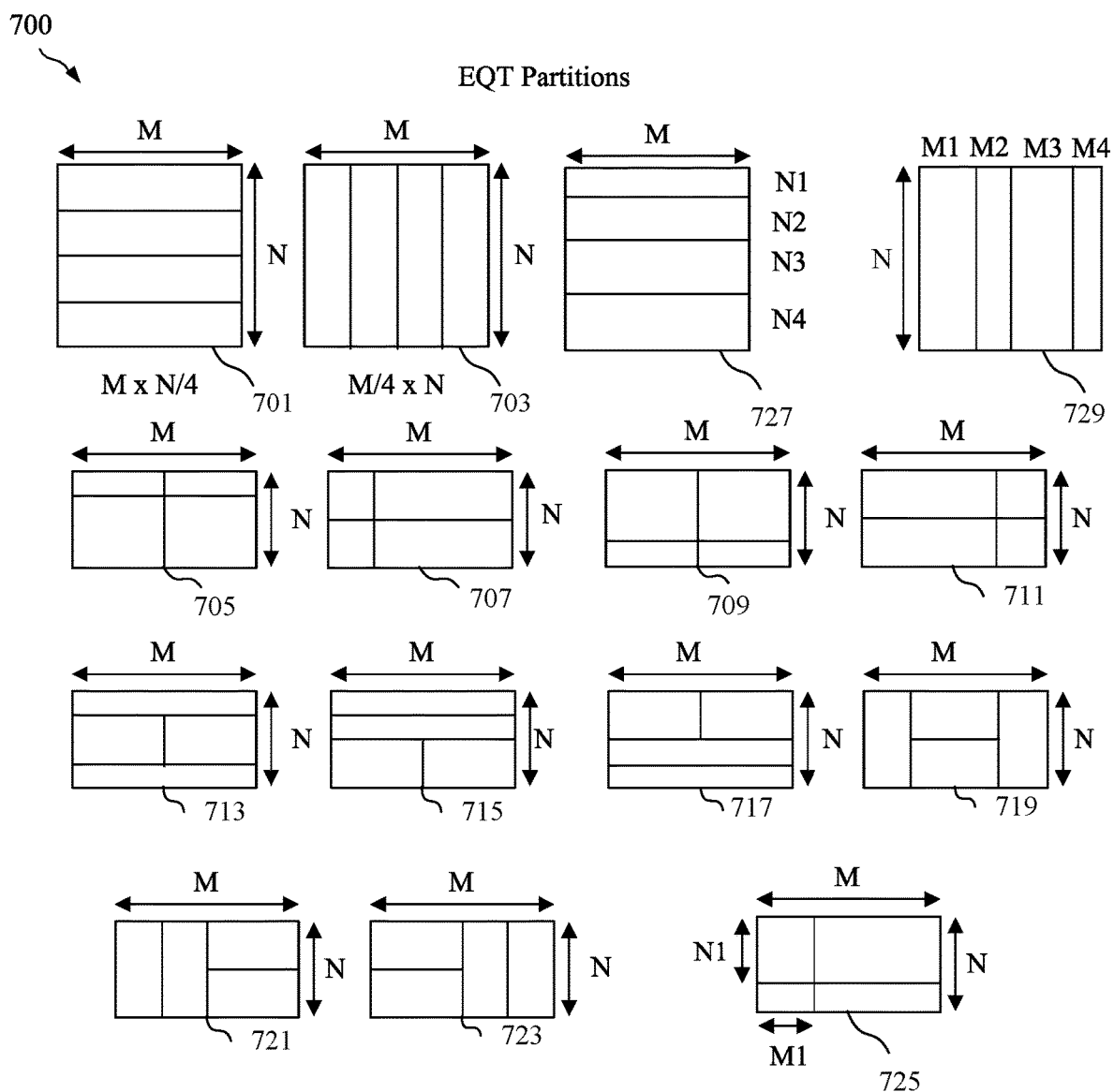
FIG. 7 is a schematic diagram of example extended quad tree (EQT) partitioning structures.

An extended quad tree is now discussed. FIG. 7 is a schematic diagram 700 of example EQT partitioning structures. An EQT partitioning structure corresponding to a block partitioning process includes an extended quad tree partitioning process for the block of video data. The extended quad partitioning structure represents partitioning the block of video data into final sub-blocks. When the extended quad tree partitioning process decides to apply an extended quad tree partition to a block, the block is always split into four sub-blocks. Decoding of the final sub-blocks is based on the video bitstream. Decoding of the block of video data is based on the final sub-blocks decoded according to the EQT structure derived.

The EQT partitioning process can be applied to a block recursively to generate EQT leaf nodes. Alternatively, when EQT is applied to a certain block, for each of the sub-blocks resulting from the EQT split, may further be split into BT and/or QT and/or TT and/or EQT and/or other kinds of partition trees. In one example, EQT and QT may share the same depth increment process and the same restrictions of leaf node sizes. In this case, the partitioning of one node can be implicitly terminated when the size of the node reaches a minimum allowed quad tree leaf node size or EQT depth with the node reaches a maximum allowed quad tree depth. Alternatively, EQT and QT may share different depth increment processes and/or restrictions of leaf node sizes. The partitioning of one node by EQT may be implicitly terminated when the size of the node reaches a minimum allowed EQT leaf node size or the EQT depth associated with the node reaches a maximum allowed EQT depth. In one example, the EQT depth and/or the minimum allowed EQT leaf node sizes may be signaled in a sequences parameter set (SPS), a picture parameter set (PPS), a slice header, a CTU, a region, a tile, and/or a CU.

EQT may not use a quad tree partition applied to a square block, for example where the block has a size of M×N where M and N are equal or unequal non-zero positive integer values. Instead, EQT splits one block equally into four partitions, such as an M/4×N split 701 or an M×N/4 split 703. Split 727 and split 729 show general examples of split 701 and 703, respectively. For example, split 727 is split into M×N1, M×N2, M×N3, and M×N4, where N1+N2+N3+N4=N. Further, split 729 is split into M1×N, M2×N, M3×N and M4×N where M1+M2+M3+M4=M.

In another example, the EQT can split the shape equally into four partitions where the partition size is dependent on the maximum and minimum values of M and N. In one example, one 4×32 block may be split into four 4×8 sub-blocks while a 32×4 block may be split into four 8×4 sub-blocks.

In another example, EQT splits one block equally into four partitions, such as two partitions are with size equal to (M*w0/w)×N*h0/h) and the other two are with (M*(w−w0)/w)×(N*(h−h0)/h) as shown by split 705, split 707, split 709, and split 711. For example, w0 and w may be equal to 1 and 2, respectively, such that the width is reduced by half while the height can use other ratios instead of 2:1 to get the sub-blocks. In another example, h0 and h may be equal to 1 and 2, respectively, such that the height is reduced by half while the width can use other ratios instead of 2:1. For example, split 705 includes a sub-block width fixed to be M/2 with a height equal to N/4 or 3N/4 with a smaller selection for the top two partitions. For example, split 707 includes a sub-block height fixed to be N/2 with a width equal to M/4 or 3M/4 with a smaller selection for the left two partitions. For example, split 709 includes a sub-block width fixed to be M/2 with a height equal to N/4 or 3N/4 with a smaller selection for the bottom two partitions. For example, split 711 includes a sub-block height fixed to be N/2 with a width equal to M/4 or 3M/4 with a smaller selection for the right two partitions.

Split 713, split 715, split 717, split 719, split 721, and split 723 show other examples of quad tree partitioning. For example, split 713, split 715, and split 717 show options where the shape is split by M×N/4 and M/2×N/2. For example, split 719, split 721, and split 723 show options where the shape is split by N×M/4 and N/2×M/2.

Split 725 shows a more general case of quad tree partitioning with different shapes of partitions. In this case, split 725 is split such that M1×N1, (M-M1)×N1, M1×(N−N1) and (M-M1)×(N−N1).

Figure 8:
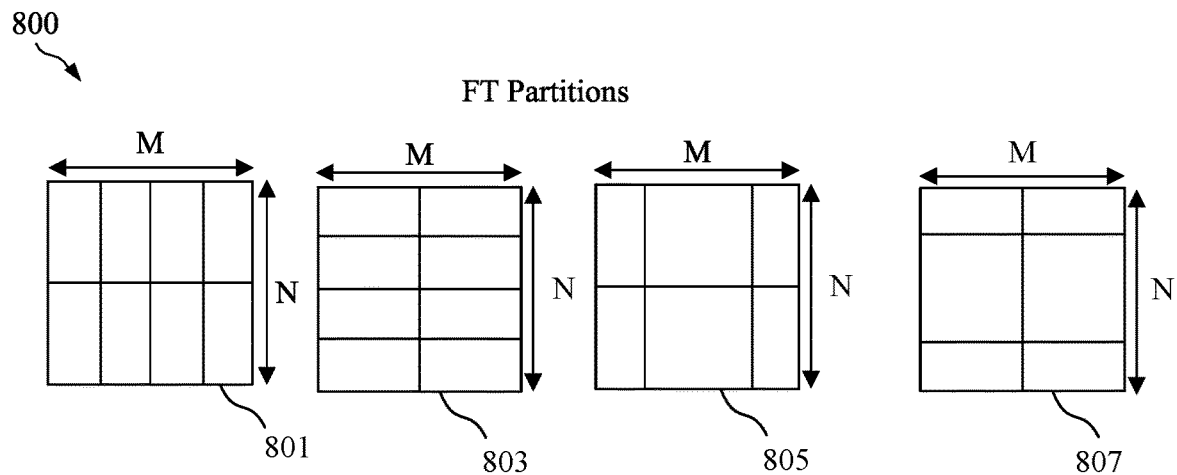
FIG. 8 is a schematic diagram of example flexible tree (FT) partitioning structures.

FIG. 8 is a schematic diagram 800 of example flexible tree (FT) partitioning structures. A FT partitioning structure corresponds to a block partitioning process including an FT partitioning process for the block of video data. The FT partitioning structure represents a partitioning for a block of video data into final sub-blocks. When the FT partitioning process decides to apply a FT partition to a block, the block is split into K sub-blocks wherein K could be larger than 4. The final sub-blocks can be coded based on the video bitstream. Further, the block of video data can be decoded based on the final sub-blocks decoded according to the FT structure derived. The FT partitioning process can be applied to a given block recursively to generate FT tree leaf nodes. The partitioning of one node is implicitly terminated when the node reaches a minimum allowed FT leaf node size or FT depth associated with the node reaches a maximum allowed FT depth. Further, when FT is applied to a certain block, multiple sub-blocks can be created. Each of the sub-blocks created by FT may further be split into BT, QT, EQT, TT, and/or other kinds of partition trees. In an example, the FT depth or the minimum allowed FT leaf node sizes or the minimum allowed partition size for FT may be signaled in a SPS, a PPS, a slice header, a CTU, a region, a tile, and/or a CU. Similar to EQT, all of the sub-blocks created by FT partitions may be the same or different sizes.

Schematic diagram 800 includes example FT partitioning structures where the number of sub-blocks, denoted as K, is set equal to six or eight. Split 801 is a partitioning structure with K=8, M/4*N/2. Split 803 is a partitioning structure with K=8, M/2*N/4. Split 805 is a partitioning structure with K=6, M/2*N/2 and M/4*N/2. Split 807 is a partitioning structure with K=6, M/2*N/2 and M/2*N/4.

Figure 9:
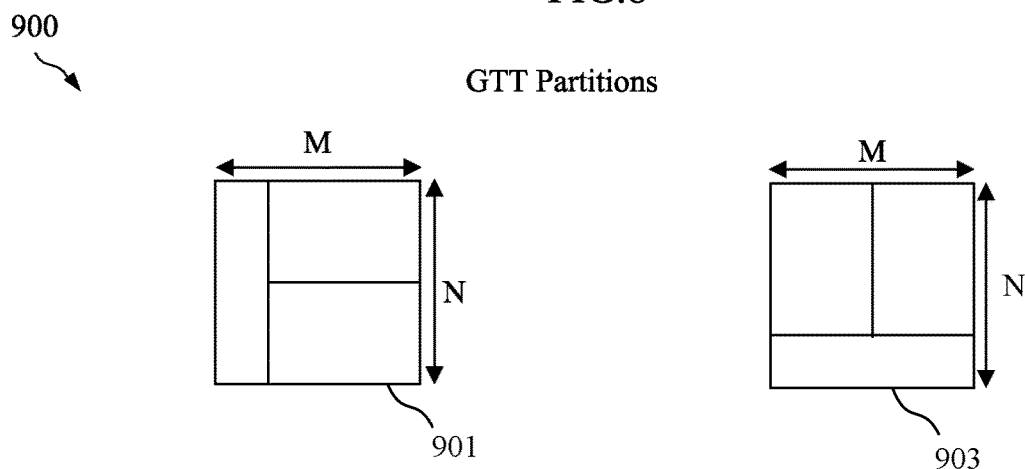
FIG. 9 is a schematic diagram of example generalized TT (GTT) partitioning structures.

FIG. 9 is a schematic diagram 900 of example generalized TT (GTT) partitioning structures. For the TT partitioning structure, the restriction of splitting along either horizonal or vertical may be removed. The GTT partition pattern may be defined as splitting for both horizontal and vertical. Split 901 employs a left split from a vertical TT split and a horizontal BT split of the remaining area. Split 903 employs a bottom split from a horizontal TT split and a vertical BT split of the remaining area. In some examples, the partitioning EQT, FT, and/or GTT partitioning methods may be applied under certain conditions. In other words, when the condition(s) are not satisfied, there is no need to signal the partition types. In another example, the EQT, FT, and/or GTT partitioning methods may be used to replace other partition tree types. In another example, the EQT, FT, and/or GTT partitioning methods may be only used as a replacement for other partition tree types under certain conditions. In one example, the condition may be based on the picture, slice types, block sizes, the coded modes; and/or whether a block is located at a picture, slice, and/or tile boundary. In one example, EQT may be treated in the same way as QT. In this case, when the QT partition tree type is selected, more flags/indications of the detailed quad-tree partition patterns may be further signaled. In some examples, EQT may be treated as additional partition patterns. In one example, the signaling of partitioning methods of EQT, FT, and/or GTT may be conditional. For example, one or more EQP, FT, and/or GTT partitioning methods may not be used in some cases, and the bits corresponding to signal these partitioning methods are not signaled.

Figure 10:
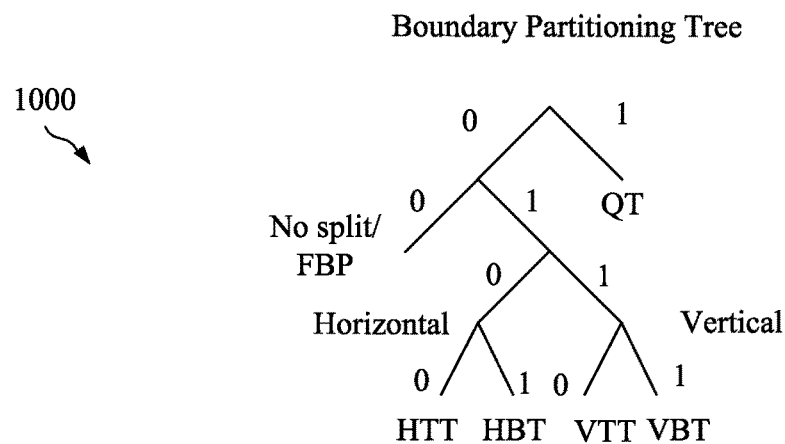
FIG. 10 is a schematic diagram of example boundary partitioning tree.

FIG. 10 is a schematic diagram of example boundary partitioning tree 1000, which is also known as a versatile boundary partition. The boundary partitioning tree 1000 is an example boundary handling method for VVC and/or Audio and Video Coding Standard Workgroup Part three (AVS-3.0). Since the forced quadtree boundary partition solution in VVC is not optimized, the boundary partitioning tree 1000 uses regular block partition syntax to maintain continuity with the CABAC engine as well as to match the picture boundary. The versatile boundary partition obtains the following rules (both encoder and decoder). Since the boundary partitioning tree 1000 uses exactly the same partition syntax of the normal block (non-boundary) for boundaries located at block, the syntax is not changed. If the no split mode is parsed for the boundary CU, the forced boundary partition (FBP) is used to match the picture boundary. After the forced boundary partition is used (non-singling boundary partition), no further partition is performed. The forced boundary partition is described as follows. If the size of block is larger than the maximal allowed BT size, forced QT is used to perform the FBP in the current forced partition level. Otherwise, if the bottom-right sample of current CU is located below the bottom picture boundary and not extended to the right boundary, a forced horizontal BT is used to perform the FBP in the current forced partition level. Otherwise, if the bottom-right sample of current CU is located at the right side of the right picture boundary and not below the bottom boundary, a forced vertical BT is used to perform the FBP in the current forced partition level. Otherwise, if the bottom-right sample of current CU is located at the right side of the right picture boundary and below the bottom boundary, a forced QT is used to perform the FBP in the current forced partition level.

Figure 11:
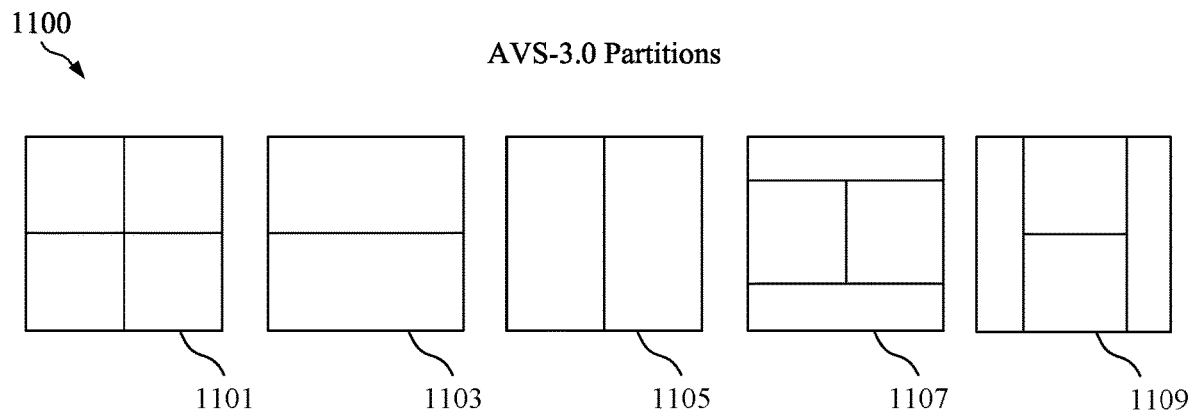
FIG. 11 is a schematic diagram of example partitioning structures used in Audio and Video Coding Standard (AVS) part three (AVS-3.0).

FIG. 11 is a schematic diagram 1100 of example partitioning structures used in Audio and Video Coding Standard (AVS) part three (AVS-3.0). Partitioning in AVS-3.0 is now discussed. The Audio and Video Coding Standard (AVS) Workgroup of China was authorized to be established by the Science and Technology Department under the former Ministry of Industry and Information Technology of People's Republic of China. With the mandate of satisfying the demands from the rapidly growing information industry, AVS is committed to producing technical standards of high quality for compression, decompression, processing, and representation of digital audio and video, and thus providing digital audio-video equipment and systems with high-efficient and economical coding/decoding technologies. AVS can be applied in wide variety of significant information sectors including high-resolution digital broadcast, high-density laser-digital storage media, wireless broad-band multimedia communication and internet broad-band stream media. AVS is one of the second generation of source coding/decoding standards and owns independent Chinese intellectual property rights. Source coding technology primarily addresses the problem of coding and compressing audio and video mass data from initial data and original sources. Hence AVS is known as digital video and audio coding technology, and is the premise of the subsequent digital transmission, storage, and broadcast. Further, AVS serves as a common standard for the digital video and audio industry.

AVS-3.0 employs a QT partitioning 1101, a vertical BT partitioning 1105, a horizontal BT partitioning 1103, and a horizontal extended quad-tree (EQT) partitioning 1107, and a vertical EQT partitioning 1109 to split a largest coding unit (LCU) into multiple CUs. QT partitioning, BT partitioning, and EQT partitioning can all be used for the root, internal nodes, or leaf nodes of the partitioning tree. However, QT partitioning is forbidden after any BT and/or EQT partitioning.

Figure 12:
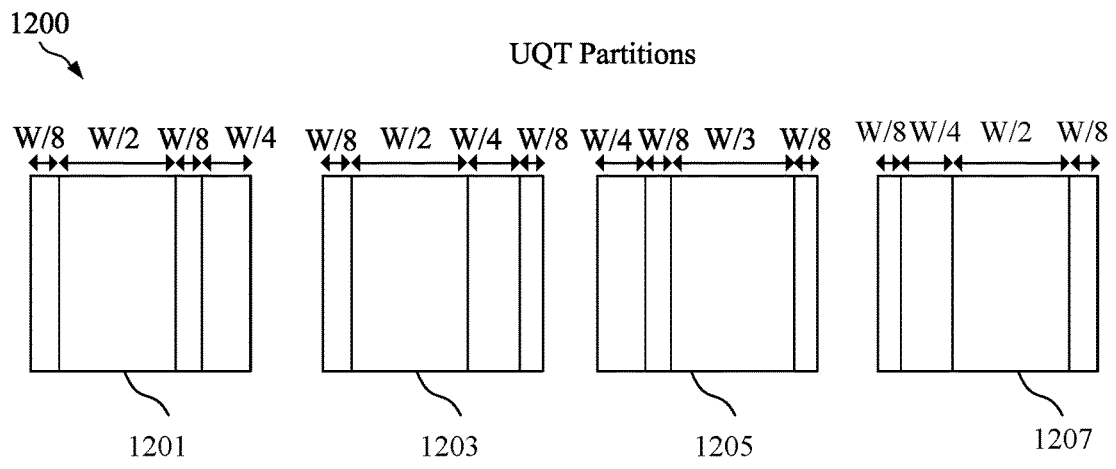
FIG. 12 is a schematic diagram of example Unsymmetrical Quad-Tree (UQT) partitioning structures.
Figure 12:
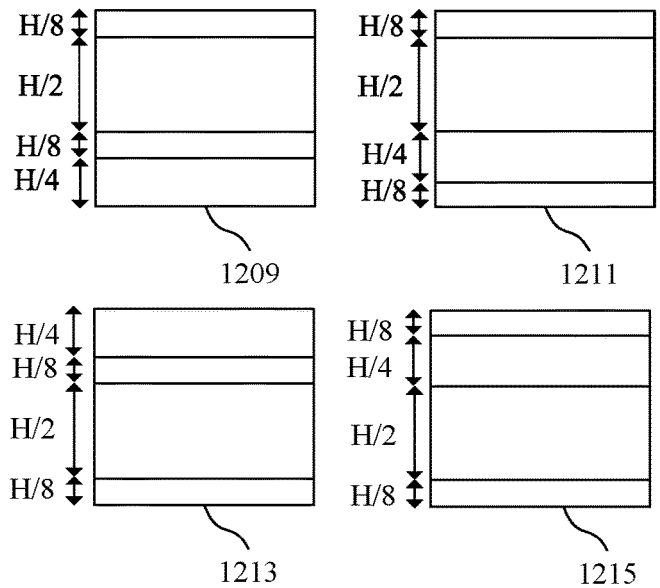

FIG. 12 is a schematic diagram 1200 of example Unsymmetrical Quad-Tree (UQT) partitioning structures. UQT partitioning employs a block with dimensions W×H, which is split into four partitions with dimensions W1×H1, W2×H2, W3×H3 and W4×H4, where W1, W2, W3, W4, H1, H2, H3, H4 are all integers. In one example, and at least one of the partitions has different block size compared to others. In one example, only two of the four partitions may have equal size, and the other two are different with each other and different from the two partitions with equal size. In one example, all the parameters are in the form of power of 2. For example, W1=2N1, W2=2N2, W3=2N3, W4=2N4, H1=2M1, H2=2M2, H3=2M3, H4=2M4. In one example, UQT only splits one partition in vertical direction, for example, H1=H2=H3=H4=H. In one example, in split 1201 W1=W/8, W2=W/2, W3=W/8, W4=W/4, H1=H2=H3=H4=H. This kind of UQT is vertical split and named as UQT1-V. In one example, in split 1203 W1=W/8, W2=W/2, W3=W/4, W4=W/8, H1=H2=H3=H4=H. This kind of UQT is vertical split and named as UQT2-V. In one example in split 1205 W1=W/4, W2=W/8, W3=W/2, W4=W/8, H1=H2=H3=H4=H. This kind of UQT is vertical split and named as UQT3-V. In one example, in split 1207 W1=W/8, W2=W/4, W3=W/2, W4=W/8, H1=H2=H3=H4=H. This kind of UQT is vertical split and named as UQT4-V.

In one example, UQT only splits one partition in horizontal direction, for example, W1=W2=W3=W4=W. In one example, in split 1209 H1=H/8, H2=H/2, H3=H/8, H4=H/4, W1=W2=W3=W4=W. This kind of UQT is horizontal split and named as UQT1-H. In one example, in split 1211 H1=H/8, H2=H/2, H3=H/4, H4=H/8, W1=W2=W3=W4=W. This kind of UQT is horizontal split and named as UQT2-H. In one example, in split 1213 H1=H/4, H2=H/8, H3=H/2, H4=H/8, W1=W2=W3=W4=W. This kind of UQT is horizontal split and named as UQT3-H. In one example, in split 1215 H1=H/8, H2=H/4, H3=H/2, H4=H/8, W1=W2=W3=W4=W. This kind of UQT is horizontal split and named as UQT4-H.

A block which is split into child blocks by UQT, may be split from a parent block by QT, BT, TT, or UQT. A block which may allow UQT partitions, may be a block generated by QT, BT, TT, or UQT partitions. A block which may allow UQT partitions, may be a block generated by QT, EQT, or BT partitions. A block which may allow UQT partitions, may be a block generated by UQT, QT, EQT or BT partitions. For example, the maximum block that allows UQT partitions may be the largest coding block (e.g., coding tree block or coding tree unit). For example, the maximum block that allows UQT partitions may be the virtual pipeline data unit (VPDU). For example, a block which allows UQT partitions may be split from a parent block by one or some specific kinds of split methods. For example, a block which is split into child blocks by UQT can only be split from a parent block by QT. In one example, the maximum/minimum block size that could allow UQT partitions and/or the maximum bit depth that could allow UQT partitions may be signaled in a SPS, a PPS, a video parameter set (VPS), an adaptation parameter set (APS), a sequence header, a picture header, a slice header, a tile group header, a CTU row/ regions, etc. In one example, the maximum/minimum block size that could allow UQT partitions and/or the maximum bit depth that could allow UQT partitions may be dependent of profile/level/tier of a standard. In one example, the maximum/minimum block size that could allow UQT partitions and/or the maximum bit depth that could allow UQT partitions may be derived, for example to be the same as the allowed QT partitions.

A block which is split from a parent block by UQT may be further split into child blocks by QT, BT, TT, and/or UQT. For example, a block which is split from a parent block by UQT may be further split into child blocks by BT. For example, a block which is split from a parent block by UQT may be further split into child blocks by TT. For example, a block which is split from a parent block by UQT may be further split into child blocks by UQT and/or QT. For example, a block which is split from a parent block by UQT cannot be further split into child blocks by QT. For example, a block which is split from a parent block by UQT may be further split into child blocks by EQT. In an example, a block split from a parent block by UQT may be further split into child blocks by UQT, EQT, and BT. For example, a block which is split from a parent block by UQT is disallowed to be further split into child blocks by UQT. In an example, a block split from a parent block by UQT may be further split into child blocks by EQT and BT.

When a parent block is split into child blocks by UQT, the split depth of the child block may be derived from the split depth of the parent block. In one example, the splitting due to UQT may be used to update the QT, BT, TT, UQT, and/or MTT depth. In one example, the QT depth of one or all of the child blocks is equal to the QT depth of the parent block plus one. In one example, the BT depth of one or all of the child blocks is equal to the BT depth of the parent block plus one. In one example, the TT depth of one or all of the child blocks is equal to the TT depth of the parent block plus one. In one example, the UQT depth of one or all of the child blocks is equal to the UQT depth of the parent block plus one. In one example, the MTT depth of one or all of the child block is equal to the MTT depth of the parent block plus one. For example, the MTT depth of the child block is equal to the MTT depth of the parent block plus one if the parent block is split into child blocks by BT. For example, the MTT depth of the child block is equal to the MTT depth of the parent block plus one if the parent block is split into child blocks by TT. In an example, the MTT depth of one or all of the child block is equal to the MTT depth of the parent block plus K where K>1. For example, K=2. In one example, K may be different for different child blocks. In one example, K=log 2(the size of the parent block/the size of the child block). For example, in split 1203 Ks for the four child blocks with W1=W/8, W2=W/2, W3=W/4 and W4=W/8 are 3, 1, 2, 3, respectively. In one example, the UQT, BT, TT, QT, and/or MTT depth increase for different child block may be different. The depth increase is dependent on the ratio of a child block compared to the parent block.

Whether and how to use UQT may depend on color format (such as 4:4:4 or 4:2:0) and/or color components. Whether and how to use UQT may depend on whether luma and chroma coding trees are separated. In one example, UQT can only be applied on the luma component when luma and chroma coding trees are separated. Whether to apply UQT and/or which kind UQT is applied may be signaled from encoder to decoder. In one example, the VPS, SPS, PPS, picture header, slice header, tile group header, and/or tile header can be used to signal whether UQT can be applied. In one example, the VPS, SPS, PPS, picture header, slice header, tile group header, and/or tile header can be used to signal which kinds of UQT can be applied. In one example, whether UQT is used to split a block may be signaled in the block. In one example, which kind of UQT is used to split a block may be signaled in the block. In one example, an index of partition type may be signaled in a block to indicate whether the block is split by QT, UQT, or a non-split. In an example, the splitting direction (horizontal/vertical) and/or splitting patterns may be further signaled. In one example, an index of a partition type may be signaled in a block to indicate whether a block is split by BT, TT, or UQT. For example, this index may be conditionally signaled, such as only when at least one of BT, TT, and UQT is valid for the block. In an example, the splitting direction (horizonal/vertical) and/or splitting patterns may be further signaled. In one example, indication of splitting direction may be signaled first and followed by the splitting pattern (such as QT, TT, UQT). In one example, a flag is signaled in a block to indicate whether a block is vertical split or horizontal split. The vertical split may be a BT vertical split, a TT vertical split, or UQT vertical split. The horizontal split may be BT horizontal split, TT horizontal split, or UQT horizontal split. For example, this flag is signaled only when the block is split by BT, TT, or UQT. For example, this flag is signaled only when both vertical split and horizontal split are valid for this block. If only vertical split is valid, the flag is not signaled and horizontal split is inferred to be used. If only horizontal split is valid, the flag is not signaled and vertical split is inferred to be used. In one example, a binarized code is signaled in a block to indicate which kind of split (BT, TT, or a kind of UQT) is used. In the following examples, X represents 0 or 1 and Y=~X(Y=1 if X=0 and Y=0 if X=1). In one example, the candidate BT, TT, or UQTs to be signaled are all vertical splits or horizontal splits depending on previously signaled or derived information. In one example, a first flag is signaled to indicate whether UQT is used. For example, the binarized codewords ordered to represent BT, TT, UQT1, UQT2, UQT3 and UQT4 are XX, XY, YXX, YXY, YYX, YYY. In one example, truncated unary code is applied. For example, the binarized codewords ordered to represent BT, TT, UQT1, UQT2, UQT3 and UQT4 are X, YX, YYX, YYYX, YYYYX, YYYYY. In one example, a first flag is signaled to indicate whether BT is used. If BT is not used, then a second flag is signaled to indicate whether UQT is used. If UQT is used, which kind of UQT is used is further signaled. For example, the binarized codewords ordered to represent BT, TT, UQT1, UQT2, UQT3 and UQT4 are X, YX, YYXX, YYXY, YYYX, YYYY.

In one example, how to signal which kind of split is used in a block may depend on which kinds of split are valid for the block. In the following examples, X represents 0 or 1 and Y=~X(Y=1 if X=0 and Y=0 if X=1). In one example, the candidate BT, TT or UQTs to be signaled are all vertical splits or horizontal splits depending on previously signaled or derived information. For example, the non-allowed or invalid split cannot be signaled from the encoder to the decoder. Accordingly, there is no codeword to represent the non-allowed or invalid split. In one example, if there is only one kind of split from BT, TT, and UQTs that is valid, then the binarized code to indicate which kind of split (BT, TT, or a kind of UQT) is used is not signaled. In one example, if there are only two kinds of split from BT, TT, and UQTs that are valid, then a flag is signaled to indicate which one of the two valid splits is used. In one example, the code to indicate which kind of split (BT, TT, or a kind of UQT) is binarized as a truncated unary code. For example, the maximum value of the truncated unary code is N−1, where N is the number of valid splits (BT, TT and UQTs). For example, no codeword represents an invalid split. In other words, the invalid split is skipped when building the codeword table. In one example, if no UQT is valid the flag indicating whether UQT is used is not signaled and is inferred to be false. For example, the binarized codewords ordered to represent BT and TT are X and Y. In one example, if only one kind of UQT is valid and UQT is signaled to be used, then no further information is signaled to indicate which UQT is used. The valid UQT is used implicitly. In one example, if only two kinds of UQT are valid and UQT is signaled to be used, then a flag is signaled to indicate which UQT is used. In one example, if only three kinds of UQT are valid and UQT is signaled to be used, then a message is signaled to indicate which UQT is used. For example, the binarized codewords ordered to represent the three UQTs are X, YX, YY. In one example, the binarization and/or signaling method is not changed according to which kinds of split is valid in the block. An invalid split cannot be chosen in a conforming bitstream.

A bin (bit) of a bin string for indications of split types can be coded by arithmetic coding with one or multiple contexts. In one example, only partial bins of a bin string may be coded with contexts and remaining bins may be coded with bypass mode (e.g., no context is utilized). In an example, all bins of a bin string may be coded with contexts. In an example, all bins of a bin string may be coded with bypass mode. For a bin coded with context, one or multiple contexts may be used.

The context may depend on the position or index of the bin, the partitioning of spatial/temporal neighboring blocks, the current partition depth (e.g., QT depth/BT depth/TT depth/UQT depth/MTT depth) of current block, the partition depth (e.g., QT depth/BT depth/TT depth/UQT depth/MTT depth) of spatial/temporal neighboring blocks and/or spatial/temporal non-adjacent blocks, the coding modes of spatial/temporal neighboring blocks, the width/height of spatial/temporal neighboring blocks, the width/height of the current block, the slice types/picture types/tile group type, the color component, the statistical results of partition types from previously coded blocks, or combinations thereof.

In an example, UQT is not allowed if a split child block crosses more than one Virtual pipeline data units (VPDUs).

In an example, UQT is not allowed if the width/height of the current block satisfies some conditions. For example, the width and height of the current block are W and H, and T1, T2 and T are some integers. UQT is not allowed if W>=T1 and H>=T2. UQT is not allowed if W>=T1 or H>=T2. UQT is not allowed if W<=T1 and H<=T2. UQT is not allowed if W<=T1 or H<=T2. UQT is not allowed if W×H<=T. UQT is not allowed if W×H>=T. Horizontal UQT is not allowed if H<=T, for example when T=16. Horizontal UQT is not allowed if H>=T, for example when T=128. Vertical UQT is not allowed if W<=T, for example when T=16. Vertical UQT is not allowed if W>=T, for example when T=128. T1, T2, and T may be signaled from the encoder to the decoder in a VPS, SPS, PPS, picture header, slice header, tile group header, and/or tile header. T1, T2, and T may depend on color components. For example, T1, T2, and T may be different for luma and chroma components. T1, T2, and T may depend on whether luma coding tree and chroma coding tree are separated. For example, T1, T2, and T may be different for luma and chroma components if the luma coding tree and chroma coding tree are separated. For example, when the transform is not supported for at least one child block due to UQT, UQT split is invalid. For example, when the depth of one block exceeding the allowed depth for UQT splitting, UQT split is invalid. For example, when any of a child block size exceeding the allowed block size due to UQT splitting, UQT split is invalid.

UQT is allowed if the width/height of the current block satisfy some conditions. For example, the width and height of the current block are W and H, T1, T2 and T are some integers. UQT is allowed if W>=T1 and H>=T2. UQT is allowed if W>=T1 or H>=T2. UQT is allowed if W<=T1 and H<=T2. UQT is allowed if W<=T1 or H<=T2. UQT is allowed if W×H<=T. UQT is allowed if W×H>=T. Horizontal UQT is allowed if H<=T, for example when T=64. Horizontal UQT is allowed if H>=T, for example when T=32. Vertical UQT is allowed if W<=T, for example when T=64. Vertical UQT is allowed if W>=T, for example when T=32. T1, T2, and T may be signaled from the encoder to the decoder in a VPS, SPS, PPS, picture header, slice header, tile group header, and/or tile header. T1, T2, and T may depend on color components. For example, T1, T2, and T may be different for luma and chroma components. T1, T2, and T may depend on whether the luma coding tree and chroma coding tree are separated. For example, T1, T2, and T may be different for luma and chroma components if the luma coding tree and chroma coding tree are separated. In one example, T1, T2, and T may depend on picture/slice types. In one example, Horizontal UQT is allowed if TP1<=H<=TP2 and/or Vertical UQT is allowed if TP1<=W<=TP2 on a P-slice/P-picture or a B-slice/B-picture. Horizontal UQT is allowed if TI1<=H<=TI2 and/or Vertical UQT is allowed if TI1<=W<=TI2 on an I-slice/I-picture. In one example, TP1 is larger than TI1. For example, TI1=32, TP1=64, TI2=TP2=64. In one example, TP2 is smaller than TI2. For example, TI2=64, TP2=32, TI1=TP1=32.

UQT is not allowed if the depth of the current block satisfies some conditions. The depth of the current block may refer to QT depth, BT depth, TT depth, UQT depth, and/or MTT depth. UQT is not allowed if the split depth<=T. UQT is not allowed if the split depth>=T. UQT is not allowed if the QT split depth<=T. UQT is not allowed if the QT split depth>=T. UQT is not allowed if the BT split depth>=T. UQT is not allowed if the BT split depth<=T. UQT is not allowed if the TT split depth>=T. UQT is not allowed if the TT split depth>=T. UQT is not allowed if the UQT split depth<=T. UQT is not allowed if the UQT split depth>=T. UQT is not allowed if the MTT split depth<=T. UQT is not allowed if the MTT split depth>=T. T may be signaled from the encoder to the decoder in a VPS, SPS, PPS, picture header, slice header, tile group header, and/or tile header. T may depend on color components. For example, T1, T2, and T may be different for the luma and chroma components. T may depend on whether luma coding tree and chroma coding tree are separated. For example, T1, T2, and T may be different for luma and chroma components if luma coding tree and chroma coding tree are separated.

UQT is allowed if the depth of the current block satisfy some conditions. The depth of the current block may refer to QT depth, BT depth, TT depth, UQT depth, or MTT depth. UQT is allowed if the split depth<=T. UQT is allowed if the split depth>=T. UQT is allowed if the QT split depth<=T. UQT is allowed if the QT split depth>=T. UQT is allowed if the BT split depth>=T. UQT is allowed if the BT split depth<=T. UQT is allowed if the TT split depth>=T. UQT is allowed if the TT split depth>=T. UQT is allowed if the UQT split depth<=T. UQT is allowed if the UQT split depth>=T. UQT is allowed if the MTT split depth<=T. UQT is allowed if the MTT split depth>=T. T may be signaled from the encoder to the decoder in a VPS, SPS, PPS, picture header, slice header, tile group header, and/or tile header. T may depend on color components. For example, T1, T2 and T may be different for luma and chroma components. T may depend on whether the luma coding tree and chroma coding tree are separated. For example, T1, T2, and T may be different for luma and chroma components if luma coding tree and chroma coding tree are separated.

In one embodiment, whether and how to use UQT may depend on the position of the current block. For example, whether and how to use UQT may depend on the whether the current block crosses the picture/tile/tile group border or not. In one example, vertical UQT is not allowed if the current block crosses the picture/tile/tile group bottom border.

In one example, horizontal UQT is not allowed if the current block crosses the picture/tile/tile group bottom border. In one example, vertical UQT is not allowed if the current block crosses the picture/tile/tile group right border. In one example, horizontal UQT is not allowed if the current block crosses the picture/tile/tile group right border. In one example, if a child block split by UQT is totally out of the picture/tile/tile group, the child block may be omitted in the encoding and/or decoding process. In one example, if a child block split by UQT is partially out of the picture/tile/tile group, the following may apply. The part out of the picture may be omitted in the encoding/decoding process. The part inside the picture may be further split. The part inside the picture may be coded as a CU. Whether the part inside the picture is coded as a CU may depend on the width (w) and height (h) of the part. In one example, the part inside the picture may be coded as a CU if w=2nw, h=2nh, where nw and nh are integers. In one example, if any child block split by UQT is partially/fully out of the picture/tile/tile group, UQT is disallowed. In one example, when UQT or certain UQT patterns is disallowed, the signalling of indication of the usage of the patterns is also skipped.

In one example, only UQT1-H, UQT2-H, UQT3-V and UQT4-V (splits 1209, 1211, 1205, and 1207, respectively) can be used. For example, a=c=2 and b=d=4. In one example, one bin, possibly with one or more contexts, is signaled to indicate whether a block is split or not, when the block can be non-split, and at least one of QT, BT-H, BT-V, TT-H, TT-V, UQT1-H, UQT2-H, UQT3-V and UQT4-V is applicable in this block. In one example, one bin, possibly with one or more contexts, is signaled to indicate whether a block is split with QT or other splits, when the block is split, and that the block can be QT split, and at least one of BT-H, BT-V, TT-H, TT-V, UQT1-H, UQT2-H, UQT3-V and UQT4-V is applicable in this block. In one example, one bin, possibly with one or more contexts, is signaled to indicate whether a block is split with vertical or horizontal split, when the block is split other than QT, at least one of BT-H, TT-H, UQT1-H, UQT2-H is applicable in this block, and at least one of BT-V, TT-V, UQT3-V and UQT4-V is applicable in this block. In one example, one bin, possibly with one or more contexts, is signaled to indicate whether a block is split with UQT or not, when the block is horizontal split other than QT, and at least one of BT-H, TT-H are available, and at least one of UQT1-H, UQT2-H is applicable in this block. When the block is vertical split other than QT, and at least one of BT-V and TT-V are available, and at least one of UQT3-V, UQT4-V is applicable in this block. In one example, one bin, possibly with one or more contexts, is signaled to indicate whether a block is split with UQT1-H or UQT2-H, when the block is horizontal split with UQT and both UQT1-H, UQT2-H is applicable in this block. UQT3-V or UQT4-V, when the block is vertical split with UQT and both UQT3-V, UQT4-V is applicable in this block. In one example, one or multiple child block of UQT1-H is not allowed to be further split with TT-H. For example, the child block with height equal to H/2 is not allowed to be further split with TT-H. In one example, one or multiple child block of UQT2-H is not allowed to be further split with TT-H. For example, the child block with height equal to H/2 is not allowed to be further split with TT-H. In one example, one or multiple child block of UQT3-V is not allowed to be further split with TT-V. For example, the child block with width equal to W/2 is not allowed to be further split with TT-V. In one example, one or multiple child block of UQT4-V is not allowed to be further split with TT-V. For example, the child block with width equal to W/2 is not allowed to be further split with TT-V. In one example, one or multiple child block of UQT1-H is not allowed to be further split with BT-H. In one example, one or multiple child block of UQT2-H is not allowed to be further split with BT-H. In one example, one or multiple child block of UQT3-V is not allowed to be further split with BT-V. In one example, one or multiple child block of UQT4-V is not allowed to be further split with BT-V. In one example, one or multiple child block of UQT1-H is not allowed to be further split with UQT-H. In one example, one or multiple child block of UQT2-H is not allowed to be further split with UQT-H. In one example, one or multiple child block of UQT3-V is not allowed to be further split with UQT-V. In one example, one or multiple child block of UQT4-V is not allowed to be further split with UQT-V. In one example, one or multiple child block of UQT1-H is not allowed to be further split. In one example, one or multiple child block of UQT2-H is not allowed to be further split. In one example, one or multiple child block of UQT3-V is not allowed to be further split. In one example, one or multiple child block of UQT4-V is not allowed to be further split. In one example, one of UQT1-H and UQT2-H is not allowed to be further split. In one example, one of UQT1-H and UQT2-H is not allowed to be further horizontal split. In one example, one of UQT3-V and UQT4-V is not allowed to be further split. In one example, one of UQT3-V and UQT4-V is not allowed to be further vertical split. In one example, one or multiple child block of UQT1-H is not allowed to be further split with EQT-H. In one example, one or multiple child block of UQT2-H is not allowed to be further split with EQT-H. In one example, one or multiple child block of UQT3-V is not allowed to be further split with EQT-H. In one example, one or multiple child block of UQT4-V is not allowed to be further split with EQT-H. In one example, one or multiple child block of UQT1-H is not allowed to be further split with EQT-V. In one example, one or multiple child block of UQT2-H is not allowed to be further split with EQT-V. In one example, one or multiple child block of UQT3-V is not allowed to be further split with EQT-V. In one example, one or multiple child block of UQT4-V is not allowed to be further split with EQT-V. The term child block of UQT may refer to a block split from a parent block with UQT, or may refer to a block whose parent block or any ancestor block (e.g. the parent block of the parent block) is split from an ancestor block with UQT.

In one example, only UQT1-H and UQT3-V (splits 1209 and 1205, respectively) can be used. For example, a=2. In another example, a=c=4. In one example, one bin, possibly with one or more contexts, is signaled to indicate whether a block is split or not, when the block can be non-split, and at least one of QT, BT-H, BT-V, TT-H, TT-V, UQT1-H and UQT3-V is applicable in this block. In one example, one bin, possibly with one or more contexts, is signaled to indicate whether a block is split with QT or other splits, when the block is split, and the block can be QT split, and at least one of BT-H, BT-V, TT-H, TT-V, UQT1-H and UQT3-V is applicable in this block. In one example, one bin, possibly with one or more contexts, is signaled to indicate whether a block is split with vertical or horizontal split, when the block is split other than QT, at least one of BT-H, TT-H and UQT1-H is applicable in this block, and at least one of BT-V, TT-V and UQT3-V is applicable in this block. In one example, one bin, possibly with one or more contexts, is signaled to indicate whether a block is split with UQT or not, when the block is horizontal split other than QT, and at least one of BT-H, TT-H are available, and UQT1-H is applicable in this block, and/or when the block is vertical split other than QT, and at least one of BT-V, TT-V are available, and UQT3-V is applicable in this block. In one example, one or multiple child blocks of UQT1-H is not allowed to be further split with TT-H. For example, the child block with height equal to H/2 is not allowed to be further split with TT-H. In one example, one or multiple child block of UQT3-V is not allowed to be further split with TT-V. For example, the child block with width equal to W/2 is not allowed to be further split with TT-V. In one example, one or multiple child block of UQT1-H is not allowed to be further split with BT-H. In one example, one or multiple child block of UQT3-V is not allowed to be further split with BT-V. In one example, one or multiple child block of UQT1-H is not allowed to be further split with UQT-H. In one example, one or multiple child block of UQT3-V is not allowed to be further split with UQT-V.

Indications of splitting types (including EQT, BT, and UQT) may be signaled after the indications of splitting or non-splitting, and/or the indications of QT. In one example, a flag may be signaled to indicate whether the block is split with a first set of UQT and BT or with a second set of UQT and EQT, wherein the UQT patterns in the first and second set are different. For example, one flag may be signaled to indicate whether a certain kind of UQTs is applied or a certain kind of BT is applied on a block. For example, one flag may be signaled to indicate whether UQT2-V/UQT2-H is applied, or BT-V/BT-H is applied on a block. In an example, one flag may be signaled to indicate whether a certain kind of UQTs is applied or a certain kind of EQTs is applied on a block. For example, one flag may be signaled to indicate whether UQT4-V/UQT4-H is applied, or EQT-V/EQT-H is applied on a block. For example, one flag may be signaled to indicate whether UQT2-V/UQT2-H is applied, or EQT-V/EQT-H is applied on a block. In an example, the splitting direction may be further signalled (e.g., horizontal split or vertical split). The above may be utilized for coding blocks in I slices/pictures. In one example, a flag may be signaled to indicate whether the block is split with BT or with a second set of UQT and EQT. In an example, if the block is not split from BT, another flag may be further signaled to indicate the usage of UQT or EQT. In an example, the splitting direction (e.g., horizontal split or vertical split) may be further signaled. In an example, another flag may be further signaled to indicate the splitting direction (e.g., horizontal split or vertical split). In an example, the splitting pattern (e.g., EQT or UQT) may be further signaled. The above may be utilized for coding blocks in PB slices/pictures. In an example, the signaling of above-mentioned flags may be skipped when the current block is not split or split according to QT. In an example, only when the current block needs to be further split and/or not split according to QT, the above-mentioned flags may be further signaled.

In one example, whether and/or how to apply UQT split for a slice/picture may depend on the slice/picture type. In one example, M kinds of UQTs can be applied on a P-slice/P-picture or a B-slice/B-picture, and N kinds of UQTs can be applied on an I-slice/I-picture. In one example, M is smaller than N. For example, M is equal to 2 and N is equal to 4. In one example, M is equal to N, however, the allowed UQTs may be different. For example, UQT2-V/UQT2-H/UQT4-V/UQT4-H can be applied on an I-slice/I-picture. For example, UQT2-V/UQT2-H can be applied on a P-slice/P-picture or a B-slice/B-picture.

Interpretation of the signaled representation of UQT split may depend on the slice/picture type. In one example, the signaled representation of UQT split in an I-slice/I-picture may be different to that in a P-slice/P-picture or a B-slice/B-picture. In one example, one flag may be signaled to indicate whether a certain kind of UQTs is applied or a certain kind of BTs is applied on a block and UQT2-V/UQT2-H/UQT4-V/UQT4-H may be applied on an I-slice/I-picture. In one example, a flag may be signaled to indicate whether the block is split with BT or with a second set of UQT and EQT and UQT2-V/UQT2-H may be applied on a P-slice/P-picture or a B-slice/B-picture.

In one example, whether and/or how to apply UQT split for a slice/picture may depend on the temporal layer of the slice/picture. In one example, UQT is not applied if the temporal layer is larger than a threshold, such as 2. In one example, M kinds of UQTs can be applied on a picture/slice with temporal layer larger than T and N kinds of UQTs can be applied on a picture/slice with temporal layer smaller than or equal to T, wherein M is smaller than N. For example, T is equal to 2, M is equal to 2 and N is equal to 4.

In one example, whether and/or how to apply UQT split for a slice/picture may depend on the whether the slice/picture can be referred by other slices/pictures. In one example, UQT is not applied on a slice/picture if it is not a reference picture for other slices/pictures.

If one kind of UQT is not allowed, the indication for it is not signaled. In one example, if no kind of UQT is allowed, the indication for UQT is not signaled.

How to signal the partitioning method may depend on the picture/slice type. In one example, the flag to indicate whether UQT is applied is signaled before the flag to indicate whether BT/EQT is applied in an I picture/slice, while the flag to indicate whether UQT is applied is signaled after the flag to indicate whether BT/EQT is applied in non-I picture/slice (e.g. a P/B picture/slice). In an example, the flag to indicate whether UQT is applied is signaled after the flag to indicate whether BT/EQT is applied in an I picture/slice, while the flag to indicate whether UQT is applied is signaled before the flag to indicate whether BT/EQT is applied in a non-I picture/slice (e.g. a P/B picture/slice).

In one example, a flag is signaled to indicate the partitioning direction of more than one partitioning methods, including UQT. For example, a flag is signaled to indicate whether vertical or horizontal partitioning is applied for UQT, EQT, and BT.

In one example, the flag to indicate whether UQT is applied (denoted as UQT_flag) may be coded by arithmetic coding with context model(s). In one example, the context model selection may depend on the picture/slice type (such as I-picture or PM-picture). In one example, a context model is used if the current picture is I-picture. Otherwise (not I-picture), a context model is selected from several candidate context models. In one example, the context model selection may depend on the existence of one or multiple neighboring blocks. In one example, the context model selection may depend on dimensions of one or multiple neighboring blocks. In the above examples, the neighboring blocks may include a left neighboring block and/or a above neighboring block. In one example, the context may depend on dimensions of the current block.

Figure 13:
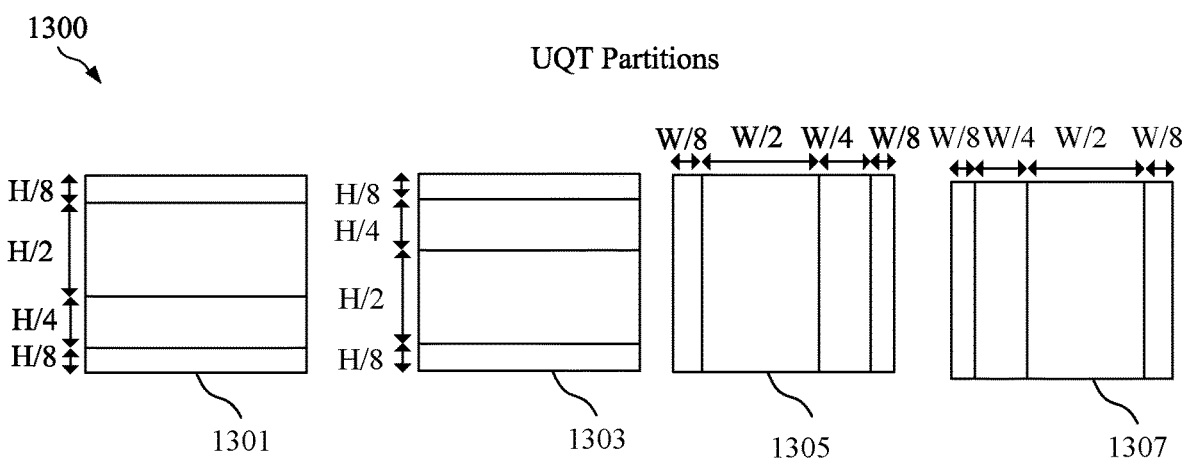
FIG. 13 is a schematic diagram of another example of UQT partitioning structures.

FIG. 13 is a schematic diagram 1300 of another example of UQT partitioning structures, for example for use with AVS-3.0. UQT partitioning is described where a parent CU is split into four CUs asymmetrically. A parent block is split into four sub-blocks with a 1:4:2:1 or a 1:2:4:1 ratio. As shown in diagram 1300, there are 4 splitting types for the UQT partition. With the horizontal UQT, a W×H parent CU is divided into two W×H/8 CUs, one W×H/4 CU and one W×H/2 CU as shown by split 1301 and split 1303. A W×H parent CU can also be divided into two W/8×H CUs, one W/4×H CU and one W/2×H CU with the vertical UQT as shown in split 1305 and 1307.

Figure 14:
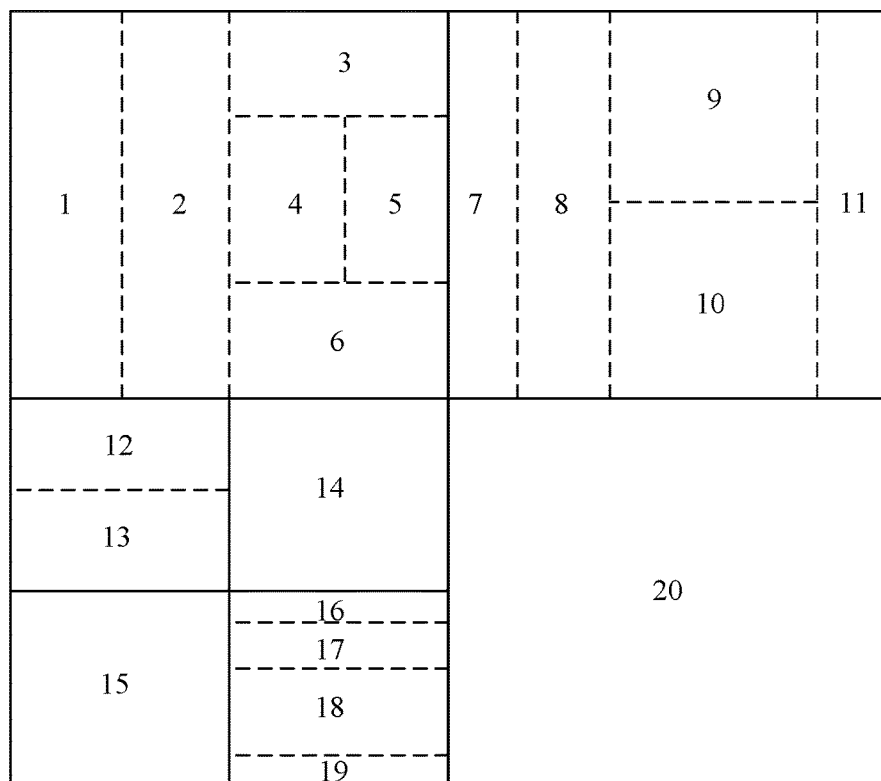
FIG. 14 is a schematic diagram of an example largest coding unit (LCU) partition with quad tree (QT), binary tree (BT), EQT, and UQT partitioning.

FIG. 14 is a schematic diagram of an example LCU partition 1400 with QT, BT, EQT, and UQT partitioning. Different from QT partitioning which cannot be used after BT and EQT partitioning, UQT partitioning can be used after BT and EQT partitioning. UQT can be applied to a direction if the length of the block along the direction is 32 to 64. An example is shown in LCU partition 1400. Similar to BT and EQT partitioning, UQT partitioning is valid after QT/BT/EQT partitioning while its sub-blocks are forbidden to split with QT partition. For B/P slices, the horizontal UQT partitioning can only be applied when the height of current block is 64 and the vertical UQT partitioning can only be applied when the width of current block is 64. Furthermore, only UQT partitioning with 1:2:4:1 ratio is allowed in B/P slices. UQT partitioning is not allowed in the B/P frames not referenced by other frames. One bit is used to signal whether the splitting mode is UQT or not.

Figure 15:
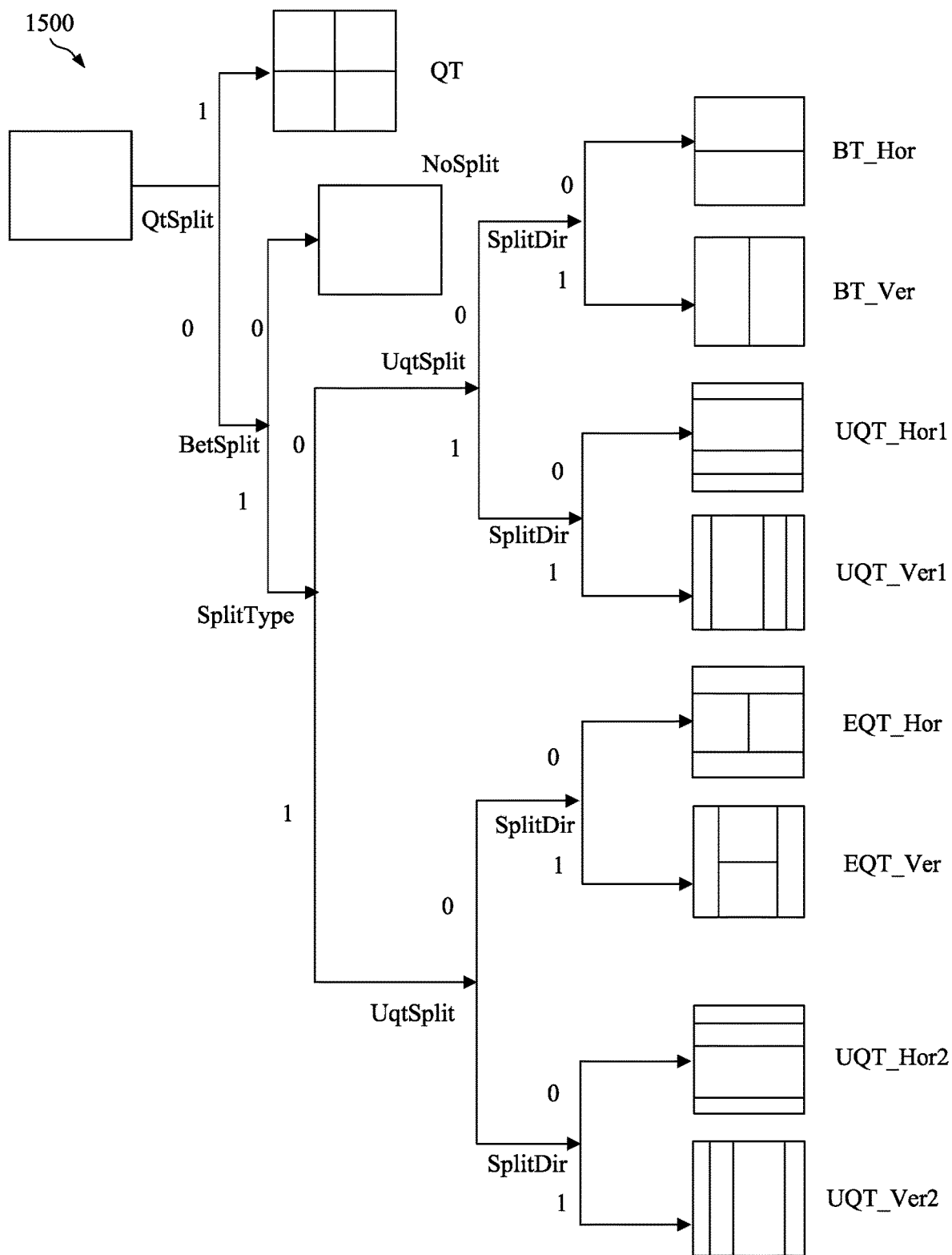
FIG. 15 is a schematic diagram of an example tree type coding structure of an intra prediction (I) slice.
Figure 16:
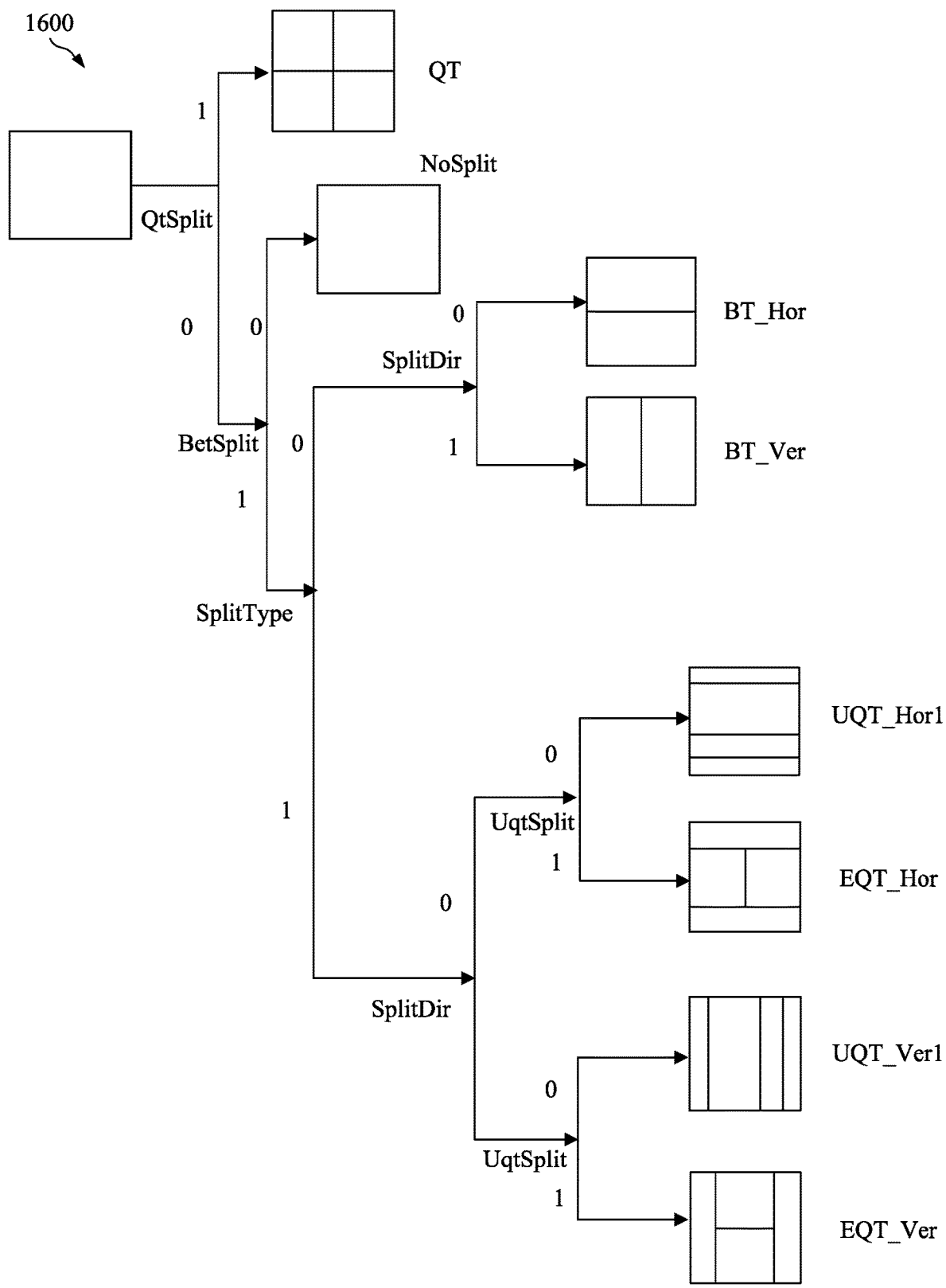
FIG. 16 is a schematic diagram of an example tree type coding structure of a bidirectional inter prediction (B) and/or unidirectional inter prediction (P) slice.

FIG. 15 is a schematic diagram 1500 of an example tree type coding structure of an I slice. FIG. 16 is a schematic diagram 1600 of an example tree type coding structure of a B and/or P slice.

The following is an embodiment of UQT based on AVS-3.0-phase 2.

```
coding_unit_tree(x0, y0, split, width, height, qt, mode, parent_split,
uqt_sub_block,) {
    isBoundary = ((x0+width) > PicWidthInLuma) || ((y0+height) >
PicHeightInLuma)
    rightBoundary = ((x0+width) > PicWidthInLuma) && ((y0+height) <=
PicHeightInLuma)
    bottomBoundary = ( (x0 + width) <= PicWidthInLuma ) && ( (y0 + height) >
PicHeightInLuma)
    allowNoSplit = 0
    allowSplitQt = 0
    allowSplitBtVer = 0
    allowSplitBtHor = 0
    allowSplitEqtVer = 0
    allowSplitEqtHor = 0
    allowSplitUqtVer1 = 0
    allowSplitUqtHor1 = 0
    allowSplitUqtVer2 = 0
    allowSplitUqtHor2 = 0
    if ( isBoundary) {
        allowNoSplit = 0
        if ((PictureType == 0) && (width > 64) && (height > 64)) {
            allowSplitQt = 1
            allowNoSplit = 1
        }
        else if ((width == 64 && height > 64) || (height == 64 && width > 64)) {
            allowSplitBtHor = 1
            allowSplitBtVer = 1
        }
        else if (! rightBoundary && ! bottomBoundary) {
            allowSplitQt = 1
        }
        else if (rightBoundary) {
            allowSplitBtVer = 1
        }
        else if (bottomBoundary) {
            allowSplitBtHor = 1
        }
    }
    else {
        if (((width == 64) && (height > 64)) || ((height == 64) && (width > 64)))
        {
            allowSplitBtHor = 1
            allowSplitBtVer = 1
            allowNoSplit = 1
        }
        else if (split >= MaxSplitTimes) {
            allowNoSplit = 1
        }
        else if ((PictureType == 0) && (width == 128) && (height == 128)) {
            allowSplitQt = 1
            allowNoSplit = 1
        }
        else {
            if ((width <= height * MaxPartRatio) && (height <= width *
MaxPartRatio))
                allowNoSplit = 1
            if ((width > MinQtSize) && qt)
                allowSplitQt = 1
            if ((width <= MaxBtSize) && (height <= MaxBtSize) && (width >
MinBtSize) && (height < MaxPartRatio*width))
                allowSplitBtVer = 1
```

```
           if ((width <= MaxBtSize) && (height <= MaxBtSize) && (height >
MinBtSize) && (width < MaxPartRatio*height))
                  allowSplitBtHor = 1
           if ((width <= MaxEqtSize) && (height <= MaxEqtSize) && (height
>= MinEqtSize*2) && (width >= MinEqtSize*4) && (height*4 <=
MaxPartRatio*width))
                  allowSplitEqtVer = 1
           if ( (width <= MaxEqtSize) && (height <= MaxEqtSize) && (width
>= MinEqtSize*2) && (height >= MinEqtSize*4) && (width *4 <=
MaxPartRatio*height) )
                  allowSplitEqtHor = 1
    if (!uqt_disable_flag){
         if(PictureType == 0){
              if (height == 64 || (height == 32 && width != 64)){
                 allowSplitUqtHor1 = 1
                    allowSplitUqtHor2 = 1
              }
              if (weight == 64 || (width == 32 && height != 64)){
                 allowSplitUqtVer1 = 1
                 allowSplitUqtVer2 = 1
              }
         }
         else if (!uqt_sub_block){
              if (height == 64){
                 allowSplitUqtHor1 = 1
              if (weight == 64){
                 allowSplitUqtVer1 = 1
              }
    if (uqt_sub_block && (parent_split == 'SPLIT_UQT_VER1' || parent_split
== 'SPLIT_UQT_HOR1')){
                  allowSplitEqtVer = 0
                  allowSplitEqtHor = 0
            }
        }
      }
}
allowSplitBt = allowSplitBtVer || allowSplitBtHor
allowSplitEqt = allowSplitEqtVer || allowSplitEqtHor
allowSplitFirstUqt = allowSplitUqtVer1 || allowSplitUqtHor1
allowSplitSecondUqt = allowSplitUqtVer2 || allowSplitUqtHor2
allowSplitUqt = allowSplitFirstUqt || allowSplitSecondUqt
if (allowSplitQt && (allowNoSplit || allowSplitBt || allowSplitEqt)) {
      qt_split_flag                                                              ae(v)
}
else {
      QtSplitFlag = allowSplitQt
}
if (! QtSplitFlag) {
      if (allowNoSplit && (allowSplitBt || allowSplitEqt)) {
           beut_split_flag                                                       ae(v)
      }
      else {
         BeutSplitFlag = ! allowNoSplit
      }
      if (BeutSplitFlag) {
         if (PictureType == 0){
         if (allowSplitUqt && (allowSplitBt || allowSplitEqt))
              uqt_split_flag                                                     ae(v)
         if ((UqtSplitFlag && allowSplitFirsrtUqt && allowSplitSecondUqt)
|| (!UqtSplitFlag && allowSplitBt && allowSplitEqt))
              beut_split_type_flag                                               ae(v)
         if ((UqtSplitFlag && !BeutSplitTypeFlag && allowSplitUqtHor1
&& allowSplitUqtVer1) || (UqtSplitFlag && BeutSplitTypeFlag &&
allowSplitUqtHor2 && allowSplitUqtVer2) || (!UqtSplitFlag
&& !BeutSplitTypeFlag && allowSplitBtHor && allowSplitBtVer) ||
(!UqtSplitFlag && BeutSplitTypeFlag && allowSplitEqtHor &&
allowSplitEqtVer))
              beut_split_dir_flag                                                ae(v)
         }
         else {
           if (allowSplitBt && (allowSplitEqt || allowSplitFirstUqt))
              beut_split_type_flag                                               ae(v)
           if ((BeutSplitTypeFlag && allowSplitEqt && allowSplitFirstUqt)
|| (!BeutSplitTypeFlag && allowSplitEqtHor && allowSplitEqtVer))
              uqt_split_flag                                                     ae(v)
              if ((BeutSplitTypeFlag && UqtSplitFlag && allowSplitUqtHor1
&& allowSplitUqtVer1) || (BeutSplitTypeFlag && !UqtSplitFlag &&
allowSplitEqtHor && allowSplitEqtVer) || (!BeutSplitTypeFlag &&
allowSplitBtHor && allowSplitBtVer))
```

```
            beut_split_dir_flag                                    ae(v)
        }
        if (allowSplitBt && allowSplitEqt)
            bet_split_type_flag                                    ae(v)
        if ((! BetSplitTypeFlag && allowSplitBtHor && allowSplitBtVer)
|| (BetSplitTypeFlag && allowSplitEqtHor && allowSplitEqtVer))
            bet_split_dir_flag                                     ae(v)
        }
    }
    if ((PictureType != 0) && ((((BeutSplitFlag && ! BeutSplitTypeFlag) ||
QtSplitFlag) && (width * height == 64)) || (BeutSplitTypeFlag && (width * height
== 128)))) {
        root_cu_mode                                               ae(v)
        modeChild = root_cu_mode ? 'PRED_Intra_Only' : 'PRED_Inter_Only'
    }
    else {
        modeChild = mode
    }
    if (ChildSizeOccur4) {
        if (Component == 0) {
            LumaWidth = width
            LumaHeight = height
            Component = 1
        }
    }
    if (parent_split == 'SPLIT_UQT_VER1' || parent_split ==
'SPLIT_UQT_VER2' || parent_split == 'SPLIT_UQT_HOR1' || parent_split ==
'SPLIT_UQT_HOR2'){
        uqt_sub_block_child = 1
    }
    else {
       uqt_sub_block_child = uqt_sub_block
    }
    if (BlockSplitMode == 'SPLIT_QT') {
        QtWidth = width / 2
        QtHeight = height / 2
        x1 = x0 + QtWidth
        y1 = y0 + QtHeight
        coding_unit_tree(x0, y0, split+1, QtWidth, QtHeight, 1, modeChild,
BlockSplitMode, uqt_sub_block_child)
        if (x1 < PicWidthInLuma)
            coding_unit_tree(x1, y0, split+1, QtWidth, QtHeight, 1, modeChild,
BlockSplitMode, uqt_sub_block_child)
        if (y1 < PicHeightInLuma)
            coding_unit_tree(x0, y1, split+1, QtWidth, QtHeight, 1, modeChild,
BlockSplitMode, uqt_sub_block_child)
        if ((x1 < PicWidthInLuma) && (y1 < PicHeightInLuma))
            coding_unit_tree(x1, y1, split+1, QtWidth, QtHeight, 1, modeChild,
BlockSplitMode, uqt_sub_block_child)
        if ((LumaWidth == width) && (LumaHeight = height) &&
ChildSizeOccur4) {
            coding_unit(x0, y0, width, height, 'PRED_No_Constraint',
'COMPONENT_Chroma')
            Component = 0
        }
    }
    else if (BlockSplitMode == 'SPLIT_BT_VER') {
        x1 = x0 + width / 2
        coding_unit_tree(x0, y0, split+1, width/2, height, 0, modeChild,
BlockSplitMode, uqt_sub_block_child)
        if (x1 < PicWidthInLuma)
            coding_unit_tree(x1, y0, split+1, width/2, height, 0, modeChild,
BlockSplitMode, uqt_sub_block_child)
        if ((LumaWidth == width) && (LumaHeight = height) &&
ChildSizeOccur4) {
            coding_unit (x0, y0, width, height, 'PRED_No_Constraint',
'COMPONENT_Chroma')
            Component = 0
        }
    }
    else if (BlockSplitMode == 'SPLIT_BT_HOR') {
        y1 = y0 + height / 2
        coding_unit_tree(x0, y0, split+1, width, height/2, 0, modeChild,
BlockSplitMode, uqt_sub_block_child)
        if (y1 < PicHeightInLuma)
            coding_unit_tree(x0, y1, split+1, width, height/2, 0, modeChild,
BlockSplitMode, uqt_sub_block_child)
        if ((LumaWidth == width) && (LumaHeight = height) &&
ChildSizeOccur4) {
```

```
            coding_unit(x0, y0, width, height, 'PRED_No_Constraint',
'COMPONENT_Chroma')
            Component = 0
        }
    }
    else if (BlockSplitMode == 'SPLIT_EQT_VER') {
        x1 = x0 + width / 4
        x2 = x0 + (3 * width / 4)
        y1 = y0 + height / 2
        coding_unit_tree(x0, y0, split+1, width/4, height, 0, modeChild,
BlockSplitMode, uqt_sub_block_child)
        coding_unit_tree(x1, y0, split+1, width/2, height/2, 0, modeChild,
BlockSplitMode, uqt_sub_block_child)
        coding_unit_tree(x1, y1, split+1, width/2, height/2, 0, modeChild,
BlockSplitMode, uqt_sub_block_child)
        coding_unit_tree(x2, y0, split+  1, width/4, height, 0, modeChild,
BlockSplitMode, uqt_sub_block_child)
        if ((LumaWidth == width) && (LumaHeight = height) &&
ChildSizeOccur4) {
            coding_unit(x0, y0, width, height, 'PRED_No_Constraint',
'COMPONENT_Chroma')
            Component = 0
        }
    }
    else if (BlockSplitMode == 'SPLIT_EQT_HOR') {
        x1 = x0 + width / 2
        y1 = y0 + height / 4
        y2 = y0 + (3 * height / 4)
        coding_unit_tree(x0, y0, split+1, width, height/4, 0, modeChild,
BlockSplitMode, uqt_sub_block_child)
        coding_unit_tree(x0, y1, split+1, width/2, height/2, 0, modeChild,
BlockSplitMode, uqt_sub_block_child)
        coding_unit_tree(x1, y1, split+1, width/2, height/2, 0, modeChild,
BlockSplitMode, uqt_sub_block_child)
        coding_unit_tree(x0, y2, split+1, width, height/4, 0, modeChild,
BlockSplitMode, uqt_sub_block_child)
        if ((LumaWidth == width) && (LumaHeight = height) &&
ChildSizeOccur4) {
            coding_unit(x0, y0, width, height, 'PRED_No_Constraint',
'COMPONENT_Chroma')
            Component = 0
        }
    }
    else if (BlockSplitMode == 'SPLIT_UQT_HOR1' || BlockSplitMode ==
'SPLIT_UQT_HOR2' || BlockSplitMode == 'SPLIT_UQT_VER1' ||
BlockSplitMode == 'SPLIT_UQT_VER2') {
        uqt_idx = BlockSplitMode == 'SPLIT_UQT_HOR1' ? 0 : (BlockSplitMode
== 'SPLIT_UQT_HOR2' ? 1 : (BlockSplitMode == 'SPLIT_UQT_VER1' ? 2 : 3))
        x_tab[4][4] = {[0, 0, 0, 0], [0, 0, 0, 0], [0, 1/8, 1/2, 1/4], [0, 1/8, 1/4, 1/2]}
        y_tab[4][4] = {[0, 1/8, 1/2, 1/4], [0, 1/8, 1/4, 1/2] , [0, 0, 0, 0], [0, 0, 0, 0]}
        w_tab[4][4] = {[0, 0, 0, 0], [0, 0, 0, 0], [1/8, 1/2, 1/4, 1/8], [1/8, 1/4, 1/2,
1/8]}
        h_tab[4][4] = {[1/8, 1/2, 1/4, 1/8], [1/8, 1/4, 1/2, 1/8], [0, 0, 0, 0], [0, 0, 0,
0] }
        coding_unit_tree(x0+x_tab[uqt_idx][0], y0+y_tab[uqt_idx][0], split+1,
width*w_tab[uqt_idx][0], height*h_tab[uqt_idx][0], 0, modeChild,
BlockSplitMode, uqt_sub_block_child)
        coding_unit_tree(x0+x_tab[uqt_idx][1], y0+y_tab[uqt_idx][1], split+1,
width*w_tab[uqt_idx][1], height*h_tab[uqt_idx][1], 0, modeChild,
BlockSplitMode, uqt_sub_block_child)
        coding_unit_tree(x0+x_tab[uqt_idx][2], y0+y_tab[uqt_idx][2], split+1,
width*w_tab[uqt_idx][2], height*h_tab[uqt_idx][2], 0, modeChild,
BlockSplitMode, uqt_sub_block_child)
        coding_unit_tree(x0+x_tab[uqt_idx][3], y0+y_tab[uqt_idx][3], split+1,
width*w_tab[uqt_idx][3], height*h_tab[uqt_idx][3], 0, modeChild,
BlockSplitMode, uqt_sub_block_child)
        if ((LumaWidth == width) && (LumaHeight = height) &&
ChildSizeOccur4) {
            coding_unit(x0, y0, width, height, 'PRED_No_Constraint',
'COMPONENT_Chroma')
            Component = 0
        }
    }
    else {
        if (Component == 0) {
            coding_unit(x0, y0, width, height, mode,
'COMPONENT_LUMACHROMA')
        }
        else if (Component == 1) {
```

```
        coding_unit(x0, y0, width, height, mode, 'COMPONENT_LUMA')
      }
    }
}
```

The following is an embodiment of context derivation. A variable ctxIdxInc is defined to indicate the context model for uqt_split_flag. Block A represents a left neighboring block with dimensions Wa*Ha. Block B represents an above neighboring block with dimensions Wb*Hb. Block E represents the current block with dimensions We*He. ctxIdxInc is derived as below:

If the current block is I-picture, ctxIdxInc is set equal to 0.
Otherwise, ctxIdxInc is derived as below:
  If (Block A exists and Ha<He) and (Block B exists and Wb<We), then ctxIdxInc is set equal to 2.
  Otherwise, If (Block A exists and Ha<He) or (Block B exists and Wb<We), then ctxIdxInc is set equal to 1.
Then ctxIdxInc is further revised as below:
If We*He>1024, ctxIdxInc is unchanged;
Otherwise, if We*He>256, ctxIdxInc is increased by 3;
Otherwise, ctxIdxInc is increased by 6.

The following are example technical problems solved by disclosed technical solutions. Although UQT can provide some partitioning patterns beyond QT, BT, and TT, there is some redundancy in different kinds of UQT.

Disclosed herein are mechanisms to address one or more of the problems listed above. For example, a mechanism for partitioning a parent block using an Extended Ternary-Tree (ETT) partitioning is disclosed. The ETT can be either a vertical ETT (ETT-V) or a horizontal ETT (ETT-H). The ETT splits the parent block into three sub-blocks, denoted herein as a proximate sub-block, a middle sub-block, and a distal sub-block. The proximate sub-block is the top or left sub-block in an ETT-H split or ETT-V split, respectively. The distal sub-block is the bottom or right sub-block in an ETT-H split or ETT-V split, respectively. In an example, the proximate sub-block and the distal sub-block have a side that is ⅛ the size of the corresponding side in the parent block. Further, the middle block has a side that is ¾ the size of the corresponding side in the parent block. So the proximate sub-block and the distal sub-block sides are each a power of two and the middle block side is not a power of two. For example, a parent block may have a width of size sixteen. An ETT-V split results in proximate and distal sub-blocks each with a width of two ($2^1$, a power of two) and a middle sub-block with a width of twelve (cannot be expressed as $2^x$ where x is a positive integer). In some examples, the proximate sub-block and the distal sub-blocks may have different sizes, such as sides that are 1/16 and 3/16 the size of the corresponding side in the parent block. The sub-blocks can be coded left to right and top to bottom for an ETT-V split and an ETT-H split, respectively. In an example, an ETT split can be used when the side of the parent block to be split (width for ETT-V and height for ETT-H) is a power of two (e.g., 2, 4, 8, 16, 32, etc.), and is disallowed when the side of the parent block to be split is not a power of two. Further, the encoder may not signal the status of an ETT split (e.g., selected or not selected) in a bitstream when ETT is disallowed due to a rule. Further, ETT may allow or disallow further splits to the sub-blocks. In an example, a rule considers a sub-block size and/or index when determining whether to further split the sub-block. For example, the rule may require a further split of a middle sub-block from an ETT split when the middle sub-block contains luma samples and is larger than a threshold. In another example, a rule may prevent horizontal splits in a middle sub-block created by ETT-V and prevent vertical splits in a middle sub-block created by ETT-H. In another example, a rule may require a vertical split in a middle sub-block created by ETT-V to create two child sub-blocks with widths that are a power of two. In another example, a rule may require a horizontal split in a middle sub-block created by ETT-H to create two child sub-blocks with heights that are a power of two. In addition, codewords may be assigned to possible allowed ETT splits and removed for disallowed splits so that disallowed splits are not signaled in the bitstream. Signaling of allowed splits may also be omitted when only one possible ETT split is allowed. The ETT split can then be inferred by a decoder. Further, splits of sub-blocks resulting from ETT can be allowed or disallowed based in thresholds. Such thresholds may be signaled in the bitstream or predefined at the encoder and decoder.

Figure 17:
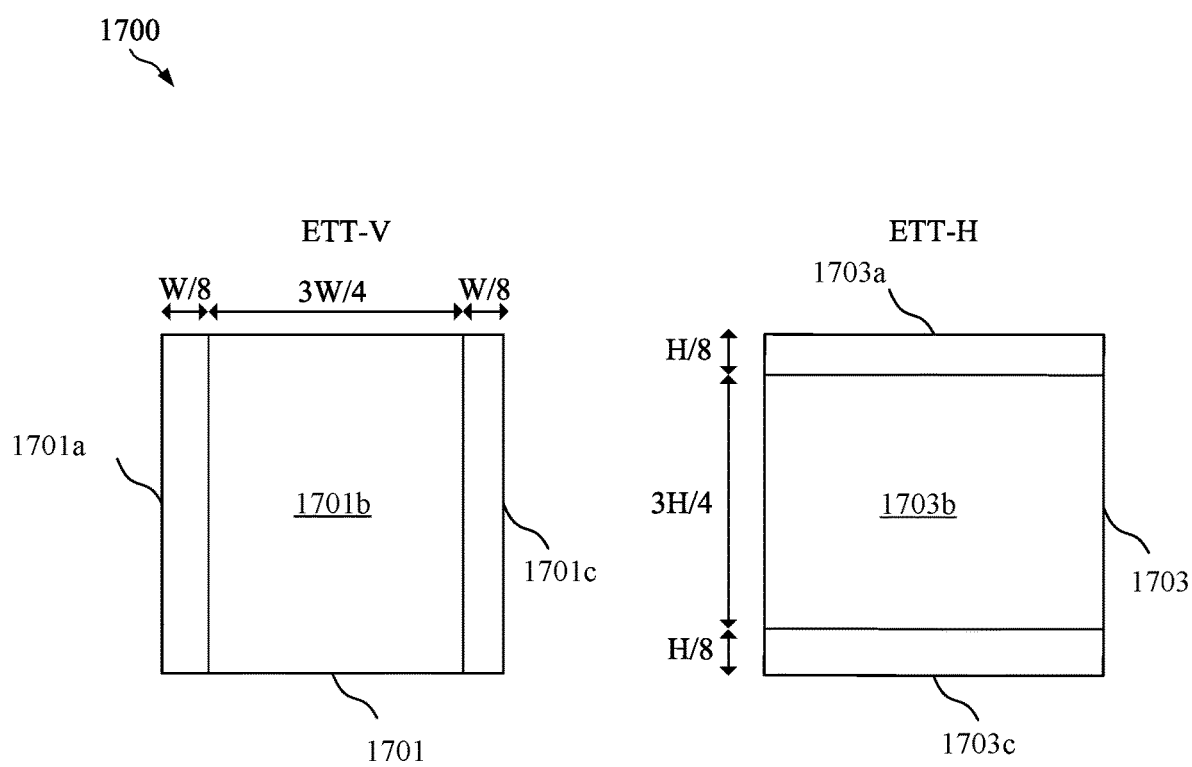
FIG. 17 is a schematic diagram of an example Extended Ternary-Tree (ETT) partitioning structures.

FIG. 17 is a schematic diagram 1700 of an example ETT partitioning structures, including an ETT-V split 1701 and an ETT-H split 1703. As shown, an ETT partition splits a parent block into three sub-blocks. For example, the ETT-V split 1701 creates a proximate sub-block 1701*a*, a middle sub-block 1701*b*, and a distal sub-block 1701*c*. Likewise, the ETT-H split 1703 creates a proximate sub-block 1703*a*, a middle sub-block 1703*b*, and a distal sub-block 1703*c*. Each proximate sub-block has a height and a width than can be denoted as H1 and W1, each middle sub-block has a height and a width than can be denoted as H2 and W2, each distal sub-block has a height and a width than can be denoted as H3 and W3, and the parent block has a height and a width than can be denoted as H and W. In ETT-V split 1701, W1=a1*W, W2=a2*W, and W3=a3*W, where a1, a2, and a3 are weighting factors (e.g., percentages), where a1+a2+a3=1, and where H1=H2=H3=H. Further, in ETT-H split 1703, H1=a1*H, H2=a2*H, and H3=a3*H, where a1, a2, and a3 are weighting factors (e.g., percentages), where a1+a2+a3=1, and where W1=W2=W3=W.

For example, each proximate sub-block and distal sub-block may have a side that is ⅛th the size of the corresponding side of the parent block, and each middle block has a size that is ¾ the size of the corresponding side of the parent block. For example, the proximate sub-block 1701*a*, the middle sub-block 1701*b*, and the distal sub-block 1701*c* may have widths that are ⅛, ¾, and ⅛ the size of the width of the parent block. Likewise, the proximate sub-block 1703*a*, the middle sub-block 1703*b*, and the distal sub-block 1703*c* may have heights that are ⅛, ¾, and ⅛ the size of the height of the parent block. This results in each proximate sub-block and distal sub-block having a split side that can be expressed as a power of two and a middle sub-block having a split side that cannot be expressed as a power of two. For example, a parent block may have a width of size sixteen. An ETT-V split 1701 results in a proximate block 1701*a* and distal sub-block 1701*c* that each with a width of two ($2^1$, a power of two) and a middle sub-block 1701*b* with a width of twelve (which cannot be expressed as $2^x$ where x is a positive integer). Accordingly, for ETT-V split 1701, W2 cannot be in a form of $W2=2^{N2}$ with any positive integer N2. Further, for ETT-V split 1701, W1 is in a form of $W1=2^{N1}$ and W3 is in a form of $W3=2^{N1}$ with a positive integer N1 and W3 is in a form of $W3=2^{N3}$ with a positive integer N3. Likewise, for ETT-H split 1703, H2 cannot be in a form of $H2=2^{N2}$ with any positive integer N2. Further, for ETT-H split 1703, W1 is in a form of $W1=2^{N1}$ and W3 is in a form of $W3=2^{N1}$ with a positive integer N1 and W3 is in a form of $W3=2^{N3}$ with a positive integer N3.

In the examples shown, W1 and W3 are equal and W2 is different for ETT-V split 1701, and H1 and H3 are equal and H2 is different for ETT-H split 1703. However, all sub-block widths or all sub-locks heights, respectively, may be different. For example, a1+a2+a3=1, but a1, a2, and a3 may all include different values. For example, the proximate sub-block 1701*a*, the middle sub-block 1701*b*, and the distal sub-block 1701*c* may have widths of ⅟₁₆ W, ¾ W, and ³⁄₁₆ W, respectively. Any such combination is permitted so long as a1+a2+a3=1, the proximate and distal sub-blocks are a power of two, and the middle sub-block is not a power of two. In an example, the sub-blocks can be coded left to right and top to bottom for an ETT-V split 1701 and an ETT-H split 1703, respectively.

In an example, a rule can decide whether an ETT partition can be performed based on the width and height of the parent block. For example, an ETT split can be used when the side of the parent block to be split (width for ETT-V split 1701 and height for ETT-H split 1703) is a power of two (e.g., 2, 4, 8, 16, 32, etc.). Further, the ETT split may be disallowed when the side of the parent block to be split (width for ETT-V split 1701 and height for ETT-H split 1703) is not a power of two. In addition, the ETT split may be disallowed when neither the width or the height of the parent block is a power of two. Partitions may be signaled between an encoder and a decoder in a bitstream. In order to increase coding efficiency, indications of the ETT split and/or which ETT type (e.g., ETT-V, ETT-H) is not signaled in the bitstream when ETT is disallowed by a rule.

Figure 18:
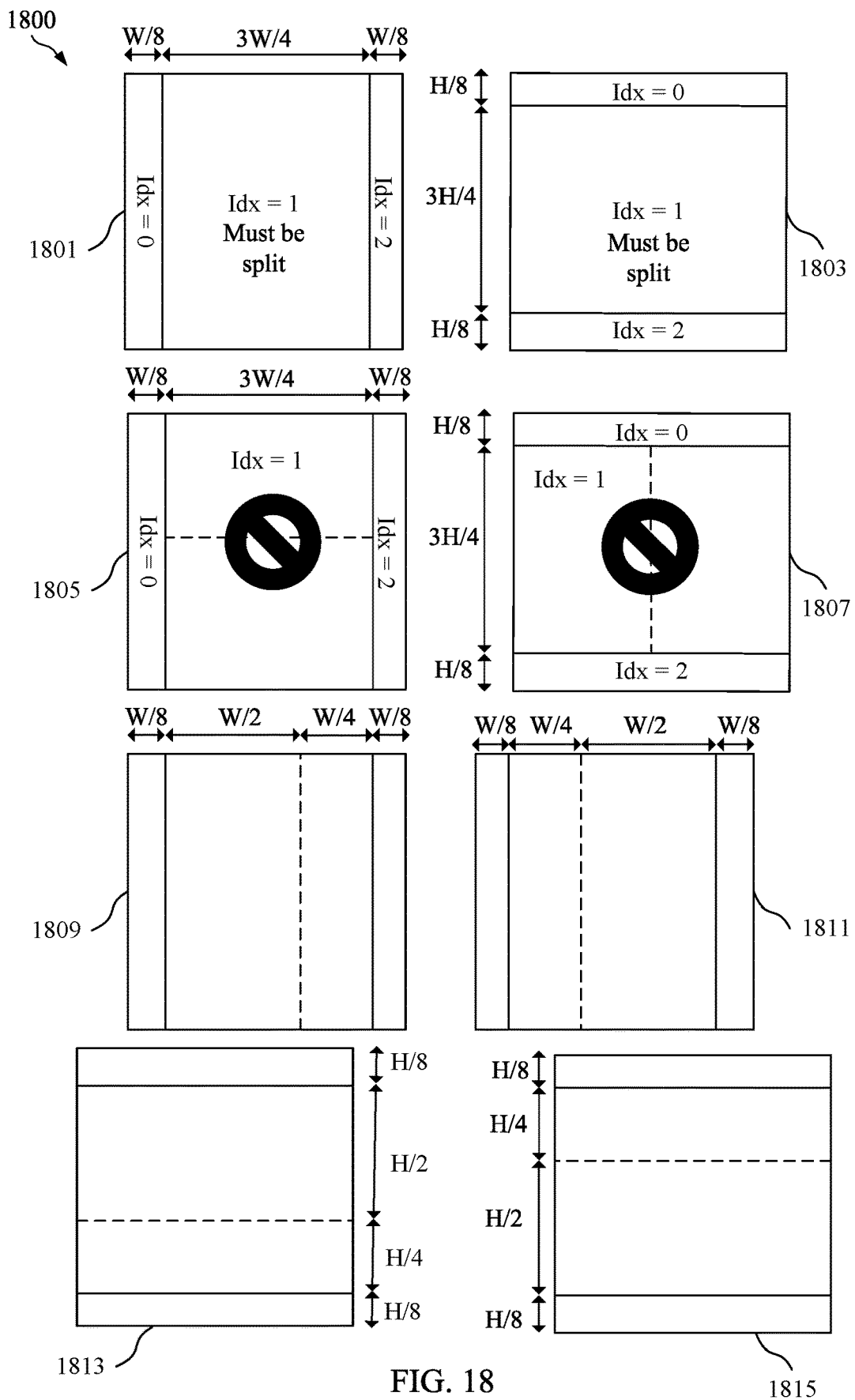
FIG. 18 is a schematic diagram of example partitions applied to sub-blocks resulting from an ETT partition.

FIG. 18 is a schematic diagram 1800 of example partitions applied to sub-blocks resulting from an ETT partition. For example, split 1801, split 1805, split 1809, and split 1811 describe further splits that may or may not be allowed on an ETT-V split 1701. Further, split 1803, split 1807, split 1813, and split 1815 describe further splits that may or may not be allowed on an ETT-H split 1703.

In an example, whether a sub-block can be further split and/or what kind of split can be applied to the sub-block is dependent on how the sub-block is generated by an ETT split from a parent block, the index of the sub-block (e.g., the coding order index of the block among all the sub-blocks split from the parent block), and/or the size of the sub-block in the split. Split 1801 and split 1803 are created by an ETT-V partition and an ETT-H partition, respectively. The proximate sub-block, middle sub-block, and distal sub-block are ordered by index 0, index 1, and index 2, respectively. In an example, a rule requires a sub-block to be further split (e.g., cannot be a leaf node) when the sub-block is split from a parent block by ETT-V or ETT-H, and when the sub-block is a middle sub-block. Accordingly, the middle sub-block of split 1801 and the middle sub-block of split 1803 must be further split according to the example rule.

In another example, a rule disallows certain splits of sub-blocks formed by ETT. For example, all horizontal splits can be disallowed for a sub-block when the sub-block is split from a parent block by ETT-V and the sub-block is a middle sub-block. Accordingly, split 1805 disallows horizontal splits of the middle sub-block. For example, such a rule can be used when the parent block exceeds the picture right boundary. In another example, all vertical splits can be disallowed for a sub-block when the sub-block is split from a parent block by ETT-H and the sub-block is a middle sub-block. Accordingly, split 1807 disallows vertical splits of the middle sub-block. For example, such a rule can be used when the parent block exceeds the picture bottom boundary.

In an example, a rule requires that a sub-block must be further split with additional predefined splits. For example, a vertical split should be applied to a sub-block to create two child-sub-blocks when the sub-block is split from a parent block by ETT-V and is a middle sub-block. The dimensions of the child sub-blocks split from the middle sub-block are in the form of a power of two. In an example, two kinds of further vertical splits are allowed. One of the further splits puts the larger child sub-block on the left and the smaller child sub-block on the right, which results in split 1809. Another of the further splits puts the larger child sub-block on the right and the smaller child sub-block on the left, which results in split 1811. For example, a rule may require the middle sub-block to be further vertically split into two child sub-blocks when the parent block exceeds the picture right boundary.

For example, a horizontal split should be applied to a sub-block to create two child-sub-blocks when the sub-block is split from a parent block by ETT-H and is a middle sub-block. The dimensions of the child sub-blocks split from the middle sub-block are in the form of a power of two. In an example, two kinds of further horizontal splits are allowed. One of the further splits puts the larger child sub-block on the top and the smaller child sub-block on the bottom, which results in split 1813. Another of the further splits puts the larger child sub-block on the bottom and the smaller child sub-block on the top, which results in split 1815. For example, a rule may require the middle sub-block to be further horizontally split into two child sub-blocks when the parent block exceeds the picture bottom boundary.

In one example, a codeword can be included in a bitstream to represent the combination of splits applied to a parent block. In an example, the codeword representing a disallowed combination of splits may be removed from the possible values in the code. Further, when only one combination of splits is allowable, the codeword can be omitted and the decoder can infer the correct split (e.g., from a predefined value) based on the absence of the codeword. This compresses the bitstream and increases coding efficiency.

In another example, a rule can determine whether a sub-block can be further split based on one or more thresholds. For example, a threshold T1 can be employed to indicate a minimum sub-block width, and a threshold T2 can be employed to indicate a minimum sub-block height. A sub-block split may be disallowed when the sub-block width is less than T1 and/or when the sub-block height is less than T2. In an example, T1 and T2 can be predefined values known to both the encoder and decoder. In another example, T1 and T2 can be selected by the encoder and signaled to the decoder in the bitstream, for example by including T1 and/or T2 in one or more syntax elements in the bitstream.

Accordingly, to address the problems mentioned above, several methods are disclosed to handle the issues caused by UQT as discussed above. The methods result in achieving better coding performance.

The detailed embodiments below should be considered as examples to explain general concepts. These embodiments should not be interpreted in a narrow way. Furthermore, these embodiments can be combined in any manner. In the following discussion, QT, BT, TT, UQT, and ETT may refer to QT split, BT split, TT split, UQT split and ETT split, respectively. In the following discussion, split and partitioning have the same meaning.

Example 1

In one example, an Extended Ternary-Tree (ETT) partitioning is described. When employing ETT, a block with dimensions width times height (W×H) is split into three partitions with dimensions W1×H1, W2×H2, and W3×H3. W1, W2, W3, H1, H2, H3 are all integers and at least one of them is not in the form of power of 2. W1, W2, and W3 are widths of resulting sub-blocks. H1, H2, and H3 are heights of resulting sub-blocks.

Example 2

In one example, W2 cannot be in a form of $W2=2^{N2}$ with any positive integer N2. In another example, H2 cannot be in a form of H2=2N2 with any positive integer N2.

Example 3

In one example, W1 is in a form of $W1=2^{N1}$ with a positive integer N1. In another example, H1 is in a form of $H1=2^{N1}$ with a positive integer N1.

Example 4

In one example, ETT only splits one partition in a vertical direction, for example where W1=a1*W, W2=a2*W, and W3=a3*W, where a1+a2+a3=1, and where H1=H2=H3=H. This kind of ETT is vertical split and may be referred to as ETT-V. In one example, W1 and W3 are equal, but both are different from W2. In one example, ETT-V split 1701 can be used where W1=W/8, W2=3*W/4, W3=W/8, and H1=H2=H3=H. In one example, the coding order is from left to right. A coding order indicates the order that partitioned blocks are encoded and/or decoded in the same video unit.

Example 5

In one example, ETT only splits one partition in horizontal direction, for example where H1=a1*H, H2=a2*H, and H3=a3*H, where a 1+a2+a3=1, and where W1=W2=W3=W. This kind of ETT is a horizontal split and may be referred to as ETT-H. In one example, H1 and H3 are equal, but both are different from H2. In one example, ETT-H split 1703 can be used where H1=H/8, H2=3*H/4, H3=H/8, and W1=W2=W3=W. In one example, the coding order is from top to bottom. A coding order indicates the order that partitioned blocks are encoded and/or decoded in the same video unit.

Example 6

In one example, for a block with block dimensions equal to W×H, whether ETT is applicable may depend on the values of W and/or H. In one example, when at least one dimension of {W, H} is in the form of power of 2, ETT is applicable. In an example, when both W and H are not in the form of power of 2, ETT is not applicable. In an example, when ETT is applicable, indications of the ETT split and/or which ETT type (e.g., ETT-V, ETT-H) may be signaled in the bitstream. In an example, when ETT is not applicable, indications of the ETT split and/or which ETT type (e.g., ETT-V, ETT-H) is not signaled in the bitstream.

Example 7

In one example, two of the three child partitions resulting from the ETT are required to have the same partition size. In one example, three child partitions are W1=a1*W, W2=a2*W, W3=a3*W, where H1=H2=H3=H and where a1+a2+a3=1. In this example, two variables of {a1, a2, a3} are required to have the same value. In one example, H1=a1*H, H2=a2*H, H3=a3*H, where W1=W2=W3=W, and where a1+a2+a3=1. In this example, at least two variables of {a1, a2, a3} are required to have the same value. In an example, a1=a2 !=a3. In an example, a1=a3 !=a2. In an example, a2=a3 !=a1.

Example 8

In one example, all three child partitions resulting from the ETT may have different partition sizes. In one example, three child partitions are W1=a1*W, W2=a2*W, W3=a3*W, where H1=H2=H3=H, and where wherein a1+a2+a3=1. In this example, any two variables of {a1, a2, a3} are not equal. In one example, three child partitions are H1=a1*H, H2=a2*H, H3=a3*H, where W1=W2=W3=W, and where a1+a2+a3=1. In this example, any two variables of {a1, a2, a3} are not equal.

Example 9

In an example, whether a block can be further split and/or what kind of split can be applied to the block may be dependent on how the block is generated by an ETT split from a parent block, the index of the block (e.g., the coding order index of the block among all the child blocks split from the block's parent block), and/or the size of the block in the split. In an example, a rule requires the block to be further split (e.g., cannot be a leaf node) when the block is split from a parent block by ETT-V or ETT-H, and when the block is the second child-block as shown in split 1801 and/or split 1803. For example, the forgoing rule is applied under the condition that the block meets other rules such as 1) the size of the block is greater than a threshold, and/or 2) the block is a luma block.

Example 10

In an example, a rule requires that some kinds of splits are not allowed to be applied on a block of an ETT split. For example, any horizontal split can be disallowed for a block when the block is split from a parent block by ETT-V and the block is the second child-block as in split 1805. For example, any horizontal split can be disallowed for a block when the parent block exceeds the picture right boundary. For example, any vertical split can be disallowed for a block when the block is split from a parent block by ETT-H and the block is the second child-block as shown in split 1807. For example, any vertical split is disallowed for the block when the parent block exceeds the picture bottom boundary.

Example 11

In an example, a rule requires that a block must be split with predefined kinds of split methods. For example, a block must be split into two child-blocks vertically when the block is split from a parent block by ETT-V and is the second child-block. The dimensions of the child-blocks are in the form of a power of 2. In one example, two kinds of further vertical split are allowed. One of the further splits puts the larger part first while the other puts the smaller part first, as shown in split 1809 and split 1811.

For example, a block must be split into two child-blocks horizontally when the block is split from a parent block by ETT-H and is the second child-block. The dimensions of the child-blocks are in the form of power of 2. In one example, two kinds of further horizontal split are allowed. One of the further splits puts the larger part first while the other puts the smaller part first, as shown in split 1813 and split 1815. For example, a block must be split into two child-blocks vertically when the parent block exceeds the picture right boundary. For example, a block must be split into two child-blocks horizontally when the parent block exceeds the picture bottom boundary.

Example 12

In one example, a codeword representing a split or non-split may be removed from the possible values that can be signaled to indicate whether and/or how to split a block. For example, when the codeword is not signalled, the split is inferred to a predefined value.

Example 13

In one example, whether a block is further split may be dependent on a threshold. For example, the block is not allowed to be further split when the width of the block is less than T1. For example, the block is not allowed to be further split when the height of the block is less than T2. For example, T1 and T2 may be pre-defined values. For example, T1 and T2 may be signalled (e.g., syntax elements) in the bitstream.

Figure 19:
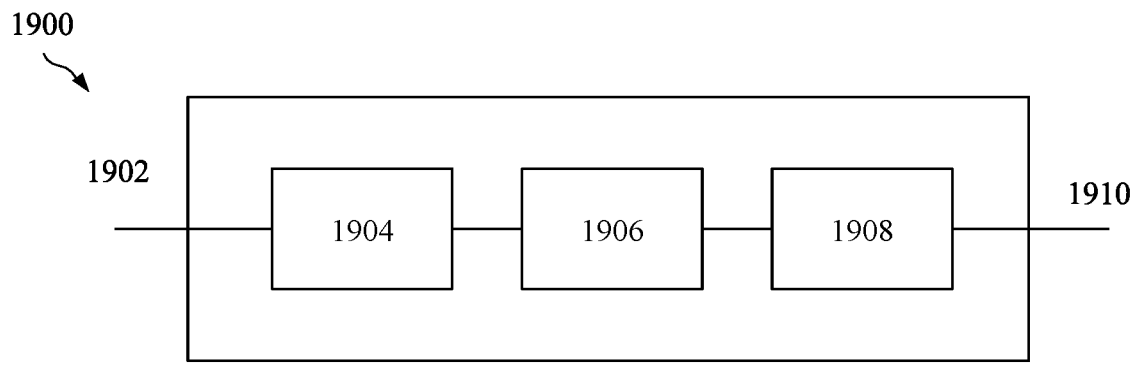
FIG. 19 is a block diagram showing an example video processing system.

FIG. 19 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by a component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 20:
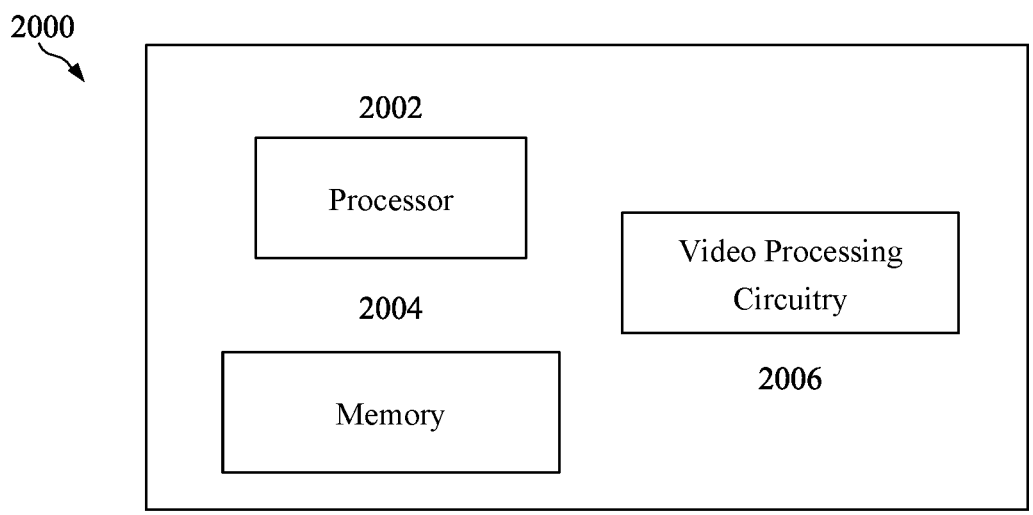
FIG. 20 is a block diagram of an example video processing apparatus.

FIG. 20 is a block diagram of an example video processing apparatus 2000. The apparatus 2000 may be used to implement one or more of the methods described herein. The apparatus 2000 may be embodied in a smartphone, tablet, computer, Internet of Things (IoT) receiver, and so on. The apparatus 2000 may include one or more processors 2002, one or more memories 2004 and video processing circuitry 2006. The processor(s) 2002 may be configured to implement one or more methods described in the present document. The memory (memories) 2004 may be used for storing data and code used for implementing the methods and techniques described herein. The video processing circuitry 2006 may be used to implement, in hardware circuitry, some techniques described in the present document. In some embodiments, the video processing circuitry 2006 may be at least partly included in the processor 2002, e.g., a graphics co-processor.

Figure 21:
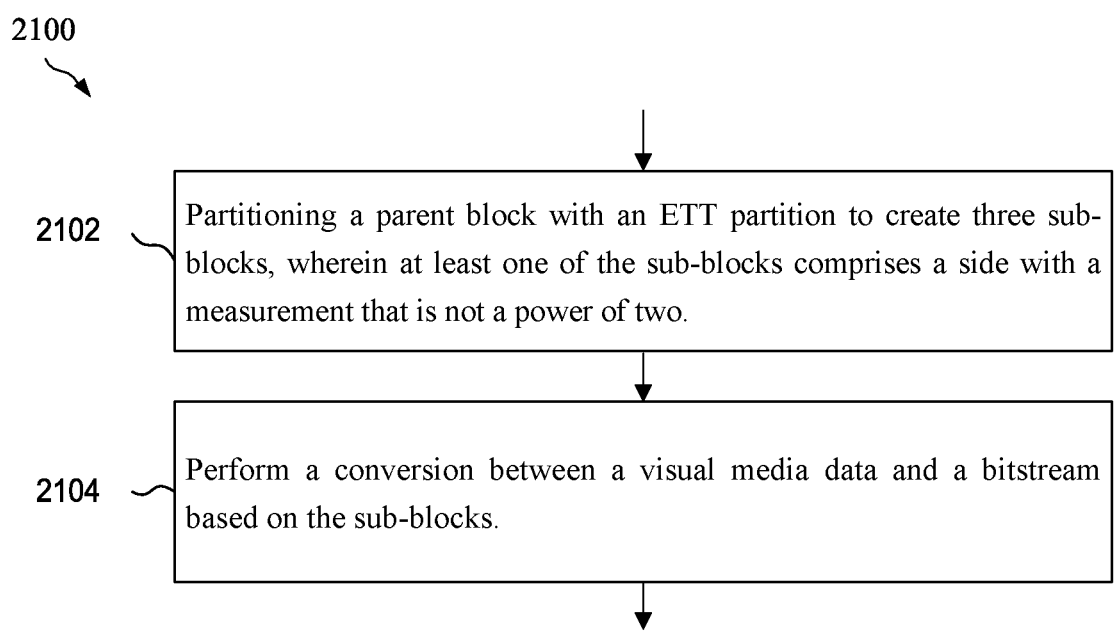
FIG. 21 is a flowchart for an example method of video processing.

FIG. 21 is a flowchart for an example method 2100 of video processing. The method 2100 includes partitioning a parent block with an ETT partition to create three sub-blocks at step 2102. At least one of the sub-blocks comprises a side with a measurement that is not a power of two. At step 2104, a conversion is performed between a visual media data and a bitstream based on the sub-blocks. In an example, the parent block includes a width (W) and a height (H). The three sub-blocks include a proximate sub-block with a width (W1) and a height (H1), a middle sub-block with a width (W2) and a height (H2), and a distal sub-block with a width (W3) and a height (H3). Further, W, W1, W2, W3, H, H1, H2, and H3 are all integers.

In an example, W2 cannot be expressed in a form of $W2=2^{N2}$ where N2 is a positive integer. In an example, H2 cannot be expressed in a form of $H2=2^{N2}$ where N2 is an integer. In an example, W1 and/or W3 is a power of two. In an example, H1 and/or H3 is a power of two.

In an example, the ETT partition is an ETT-V partition. In such a case, the three sub-blocks have a collective width equal to the width of the parent block. Also, the three sub-blocks each have a height equal to the height of the parent block. In an example, W1 is equal to ⅛*W, W2 is equal to ¾*W, and W3 is equal to ⅛*W. The three sub-blocks may be coded in a coding order from left to right.

In an example, the ETT partition is an ETT-V partition. In such a case, the three sub-blocks have a collective height equal to the height of the parent block, and the three sub-blocks each have a width equal to the width of the parent block. In an example, H1 is equal to ⅛*H, H2 is equal to ¾*H, and H3 is equal to ⅛*H. The three sub-blocks are coded in a coding order from top to bottom.

In an example, the ETT partition is allowed only allowed when a side of the parent block is a power of two. In an example, an indication of the ETT partition is included in a bitstream only when the ETT partition is allowed. In an example, two of the sub-blocks have a same width and one of the sub-blocks has a different width. In an example, two of the sub-blocks have a same height and one of the sub-blocks has a different height. In an example, all of the sub-blocks have different widths. In an example, all of the sub-blocks have different heights.

In an example, the method 2100 further comprises determining whether to partition the sub-blocks based on the ETT partition of the parent block, indices of the sub-blocks, and sizes of the sub-blocks. In an example, the middle sub-block is partitioned when the middle sub-block is larger than a threshold and when the middle sub-block contains luma samples. In an example, the middle sub-block is not partitioned by a horizontal split when the ETT is an ETT-V, and wherein the middle sub-block is not partitioned by a vertical split when the ETT is an ETT-H. In an example, the middle sub-block is vertically partitioned into two child sub-blocks when the ETT is an ETT-V. In an example, the middle sub-block is horizontally partitioned into two child sub-blocks when the ETT is an ETT-H.

In an example, the ETT partition is inferred from a predefined value when a codeword for the ETT partition is not signaled in a bitstream. In an example, the ETT partition is performed only when a height of the parent block is larger than a minimum height threshold and when a width of the parent block is larger than a minimum width threshold.

It should be noted that the method 2100 can be implemented in an apparatus for processing video data comprising a processor and a non-transitory memory with instructions thereon, such as video encoder 2300, video decoder 2400, and/or encoder 2500. In such a case, the instructions upon execution by the processor, cause the processor to perform the method 2100. Further, the method 2100 can be performed by a non-transitory computer readable medium comprising a computer program product for use by a video coding device. The computer program product comprises computer executable instructions stored on the non-transitory computer readable medium such that when executed by a processor cause the video coding device to perform the method 2100.

Figure 22:
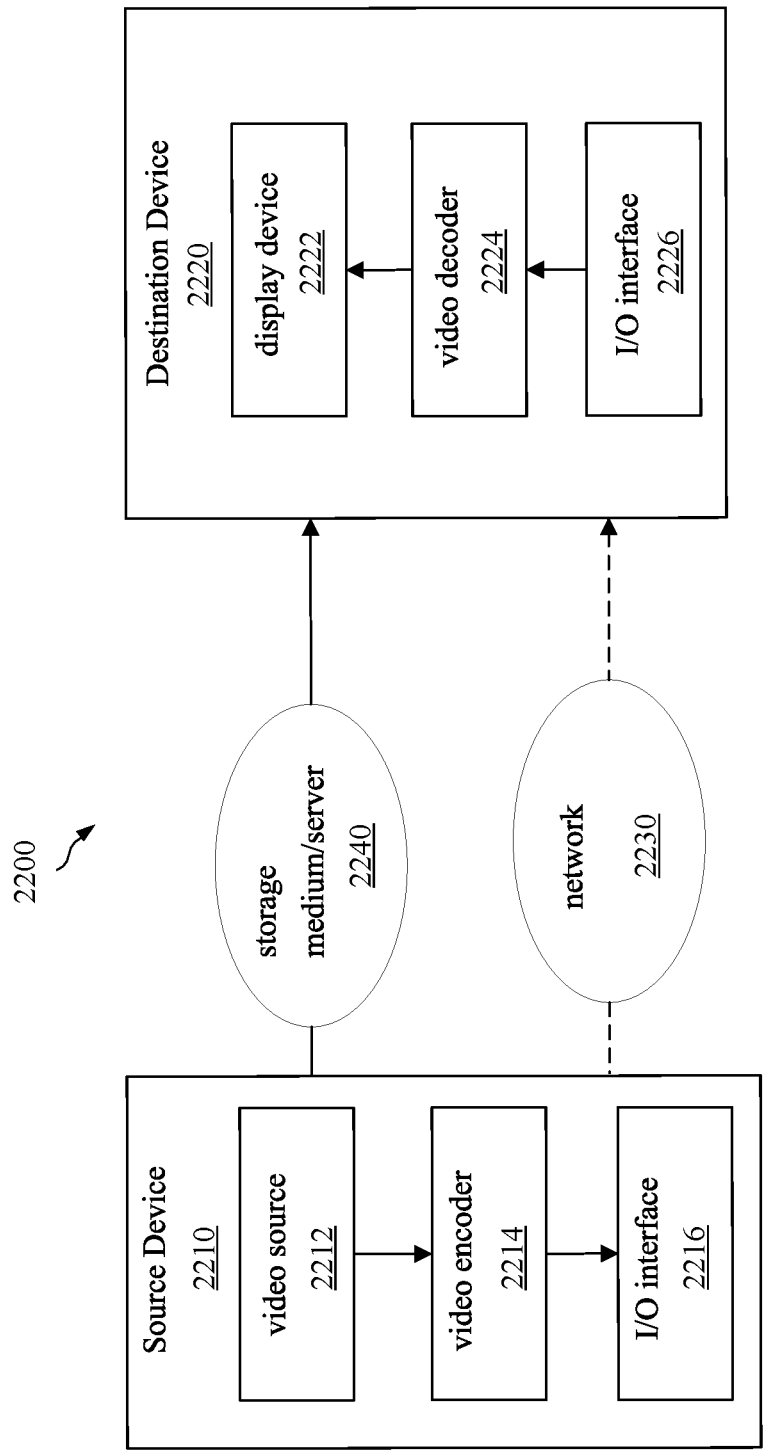
FIG. 22 is a block diagram that illustrates an example video coding system.

FIG. 22 is a block diagram that illustrates an example video coding system 2200 that may utilize the techniques of this disclosure. As shown in FIG. 22, video coding system 2200 may include a source device 2210 and a destination device 2220. Source device 2210 generates encoded video data which may be referred to as a video encoding device. Destination device 2220 may decode the encoded video data generated by source device 2210 which may be referred to as a video decoding device.

Source device 2210 may include a video source 2212, a video encoder 2214, and an input/output (I/O) interface 2216. Video source 2212 may include a source such as a video capture device, an interface to receive video data from a video content provider, and/or a computer graphics system for generating video data, or a combination of such sources. The video data may comprise one or more pictures. Video encoder 2214 encodes the video data from video source 2212 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 2216 may include a modulator/demodulator (modem) and/or a transmitter. The encoded video data may be transmitted directly to destination device 2220 via I/O interface 2216 through network 2230. The encoded video data may also be stored onto a storage medium/server 2240 for access by destination device 2220.

Destination device 2220 may include an I/O interface 2226, a video decoder 2224, and a display device 2222. I/O interface 2226 may include a receiver and/or a modem. I/O interface 2226 may acquire encoded video data from the source device 2210 or the storage medium/server 2240. Video decoder 2224 may decode the encoded video data. Display device 2222 may display the decoded video data to a user. Display device 2222 may be integrated with the destination device 2220, or may be external to destination device 2220, which can be configured to interface with an external display device.

Video encoder 2214 and video decoder 2224 may operate according to a video compression standard, such as the High Efficiency Video Coding (HEVC) standard, Versatile Video Coding (VVM) standard and other current and/or further standards.

Figure 23:
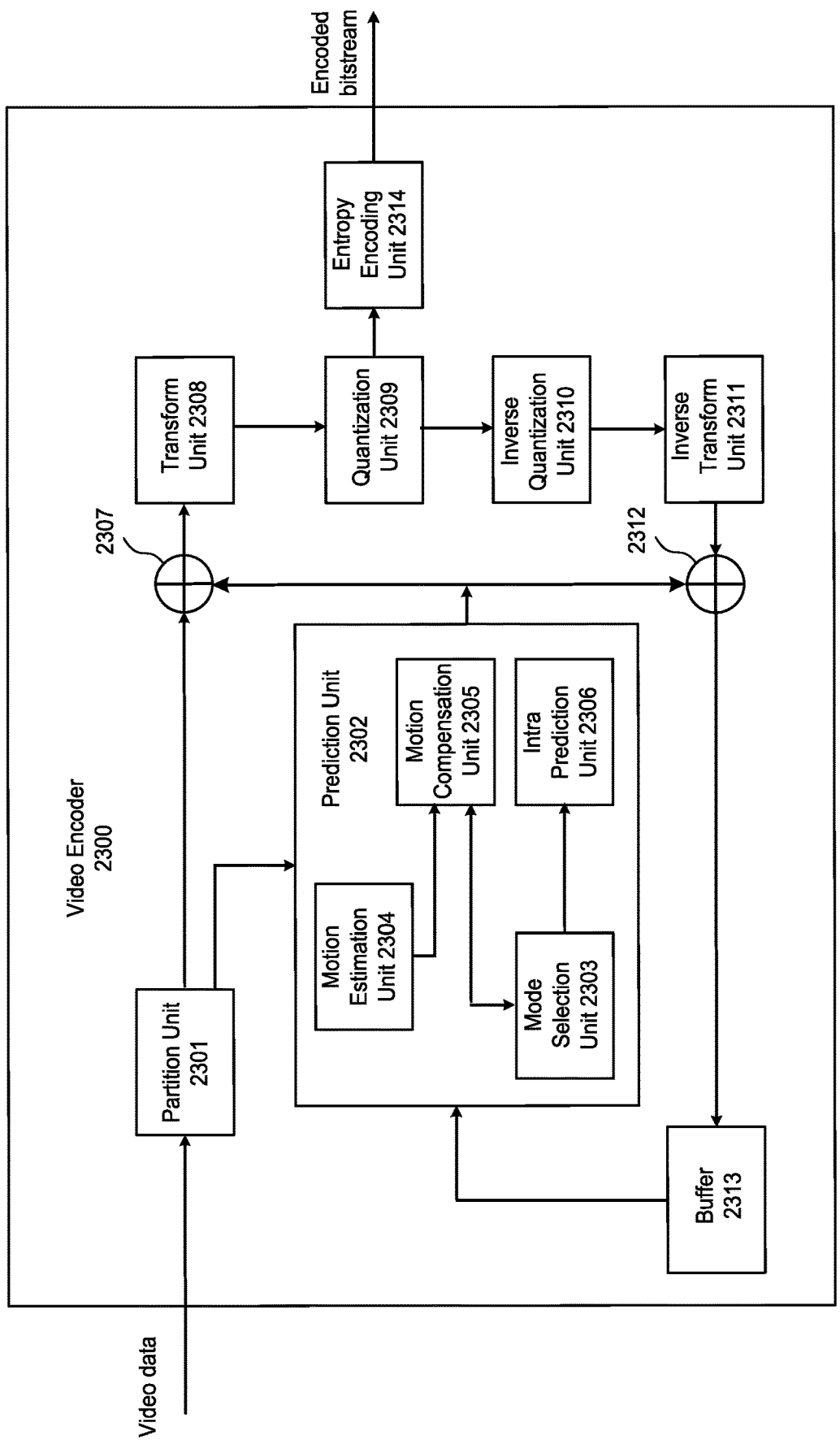
FIG. 23 is a block diagram that illustrates an example encoder.

FIG. 23 is a block diagram illustrating an example of video encoder 2300, which may be video encoder 2214 in the system 2200 illustrated in FIG. 22. Video encoder 2300 may be configured to perform any or all of the techniques of this disclosure. In the example of FIG. 23, video encoder 2300 includes a plurality of functional components. The techniques described in this disclosure may be shared among the various components of video encoder 2300. In some examples, a processor may be configured to perform any or all of the techniques described in this disclosure.

The functional components of video encoder 2300 may include a partition unit 2301, a prediction unit 2302 which may include a mode selection unit 2303, a motion estimation unit 2304, a motion compensation unit 2305, an intra prediction unit 2306, a residual generation unit 2307, a transform processing unit 2308, a quantization unit 2309, an inverse quantization unit 2310, an inverse transform unit 2311, a reconstruction unit 2312, a buffer 2313, and an entropy encoding unit 2314.

In other examples, video encoder 2300 may include more, fewer, or different functional components. In an example, prediction unit 2302 may include an intra block copy (IBC) unit. The IBC unit may perform prediction in an IBC mode in which at least one reference picture is a picture where the current video block is located.

Furthermore, some components, such as motion estimation unit 2304 and motion compensation unit 2305 may be highly integrated, but are represented in the example of FIG. 23 separately for purposes of explanation.

Partition unit 2301 may partition a picture into one or more video blocks. Video encoder 2300 and video decoder 2400 may support various video block sizes.

Mode selection unit 2303 may select one of the coding modes, intra or inter, e.g., based on error results, and provide the resulting intra or inter coded block to a residual generation unit 2307 to generate residual block data and to a reconstruction unit 2312 to reconstruct the encoded block for use as a reference picture. In some examples, mode selection unit 2303 may select a combination of intra and inter prediction (CIIP) mode in which the prediction is based on an inter prediction signal and an intra prediction signal. Mode selection unit 2303 may also select a resolution for a motion vector (e.g., a sub-pixel or integer pixel precision) for the block in the case of inter prediction.

To perform inter prediction on a current video block, motion estimation unit 2304 may generate motion information for the current video block by comparing one or more reference frames from buffer 2313 to the current video block. Motion compensation unit 2305 may determine a predicted video block for the current video block based on the motion information and decoded samples of pictures from buffer 2313 other than the picture associated with the current video block.

Motion estimation unit 2304 and motion compensation unit 2305 may perform different operations for a current video block, for example, depending on whether the current video block is in an I slice, a P slice, or a B slice.

In some examples, motion estimation unit 2304 may perform uni-directional prediction for the current video block, and motion estimation unit 2304 may search reference pictures of list 0 or list 1 for a reference video block for the current video block. Motion estimation unit 2304 may then generate a reference index that indicates the reference picture in list 0 or list 1 that contains the reference video block and a motion vector that indicates a spatial displacement between the current video block and the reference video block. Motion estimation unit 2304 may output the reference index, a prediction direction indicator, and the motion vector as the motion information of the current video block. Motion compensation unit 2305 may generate the predicted video block of the current block based on the reference video block indicated by the motion information of the current video block.

In other examples, motion estimation unit 2304 may perform bi-directional prediction for the current video block, motion estimation unit 2304 may search the reference pictures in list 0 for a reference video block for the current video block and may also search the reference pictures in list 1 for another reference video block for the current video block. Motion estimation unit 2304 may then generate reference indexes that indicate the reference pictures in list 0 and list 1 containing the reference video blocks and motion vectors that indicate spatial displacements between the reference video blocks and the current video block. Motion estimation unit 2304 may output the reference indexes and the motion vectors of the current video block as the motion information of the current video block. Motion compensation unit 2305 may generate the predicted video block of the current video block based on the reference video blocks indicated by the motion information of the current video block.

In some examples, motion estimation unit 2304 may output a full set of motion information for decoding processing of a decoder. In some examples, motion estimation unit 2304 may not output a full set of motion information for the current video. Rather, motion estimation unit 2304 may signal the motion information of the current video block with reference to the motion information of another video block. For example, motion estimation unit 2304 may determine that the motion information of the current video block is sufficiently similar to the motion information of a neighboring video block.

In one example, motion estimation unit 2304 may indicate, in a syntax structure associated with the current video block, a value that indicates to the video decoder 2400 that the current video block has the same motion information as another video block.

In another example, motion estimation unit 2304 may identify, in a syntax structure associated with the current video block, another video block and a motion vector difference (MVD). The motion vector difference indicates a difference between the motion vector of the current video block and the motion vector of the indicated video block. The video decoder 2400 may use the motion vector of the indicated video block and the motion vector difference to determine the motion vector of the current video block.

As discussed above, video encoder 2300 may predictively signal the motion vector. Two examples of predictive signaling techniques that may be implemented by video encoder 2300 include advanced motion vector prediction (AMVP) and merge mode signaling.

Intra prediction unit 2306 may perform intra prediction on the current video block. When intra prediction unit 2306 performs intra prediction on the current video block, intra prediction unit 2306 may generate prediction data for the current video block based on decoded samples of other video blocks in the same picture. The prediction data for the current video block may include a predicted video block and various syntax elements.

Residual generation unit 2307 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 2307 may not perform the subtracting operation.

Transform processing unit 2308 may generate one or more transform coefficient video blocks for the current video block by applying one or more transforms to a residual video block associated with the current video block.

After transform processing unit 2308 generates a transform coefficient video block associated with the current video block, quantization unit 2309 may quantize the transform coefficient video block associated with the current video block based on one or more quantization parameter (QP) values associated with the current video block.

Inverse quantization unit 2310 and inverse transform unit 2311 may apply inverse quantization and inverse transforms to the transform coefficient video block, respectively, to reconstruct a residual video block from the transform coefficient video block. Reconstruction unit 2312 may add the reconstructed residual video block to corresponding samples from one or more predicted video blocks generated by the prediction unit 2302 to produce a reconstructed video block associated with the current block for storage in the buffer 2313.

After reconstruction unit 2312 reconstructs the video block, the loop filtering operation may be performed to reduce video blocking artifacts in the video block.

Entropy encoding unit 2314 may receive data from other functional components of the video encoder 2300. When entropy encoding unit 2314 receives the data, entropy encoding unit 2314 may perform one or more entropy encoding operations to generate entropy encoded data and output a bitstream that includes the entropy encoded data.

Figure 24:
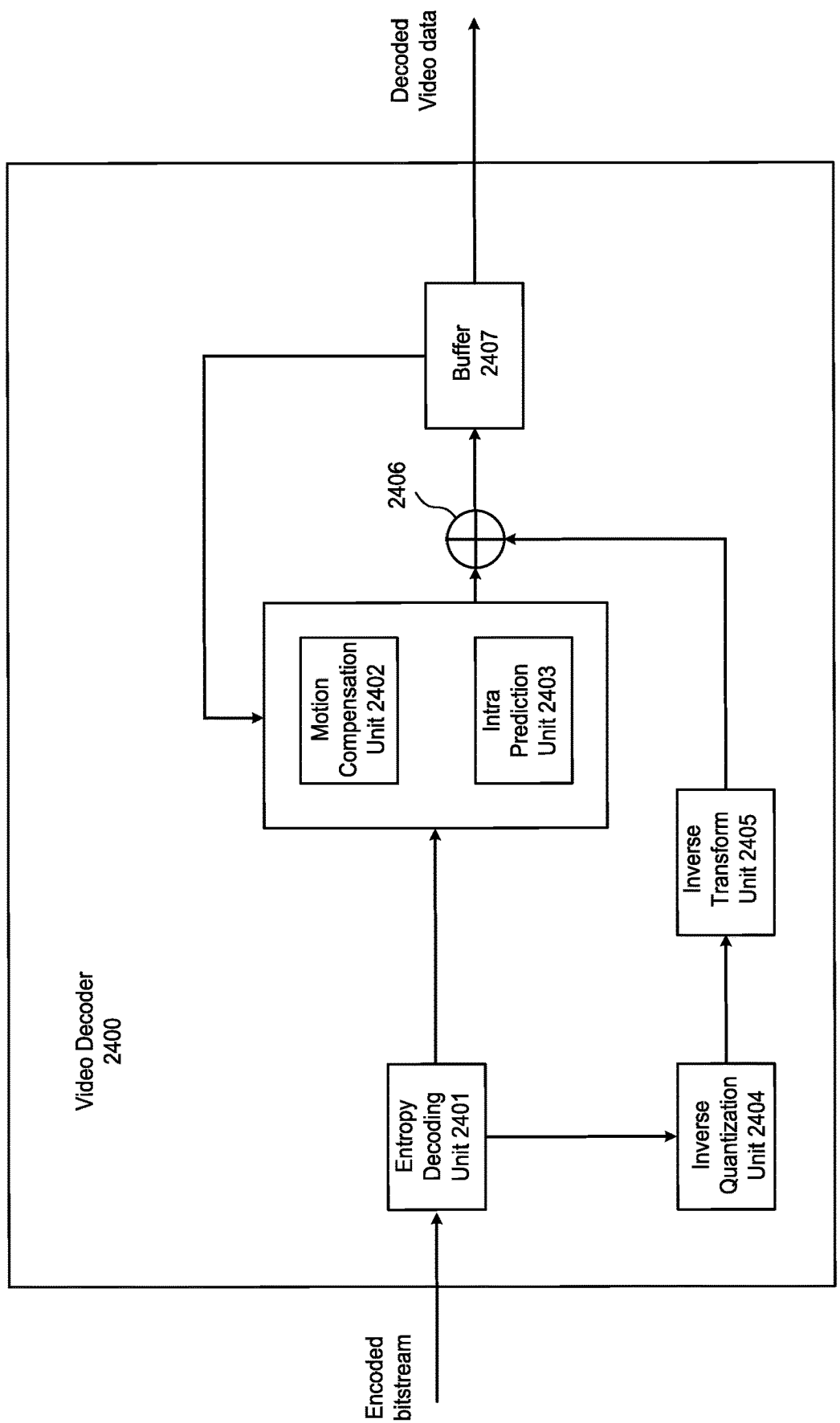
FIG. 24 is a block diagram that illustrates an example decoder.

FIG. 24 is a block diagram illustrating an example of video decoder 2400 which may be video decoder 2224 in the system 2200 illustrated in FIG. 22.

The video decoder 2400 may be configured to perform any or all of the techniques of this disclosure. In the example of FIG. 24, the video decoder 2400 includes a plurality of functional components. The techniques described in this disclosure may be shared among the various components of the video decoder 2400. In some examples, a processor may be configured to perform any or all of the techniques described in this disclosure.

In the example of FIG. 24, video decoder 2400 includes an entropy decoding unit 2401, a motion compensation unit 2402, an intra prediction unit 2403, an inverse quantization unit 2404, an inverse transformation unit 2405, and a reconstruction unit 2406 and a buffer 2407. Video decoder 2400 may, in some examples, perform a decoding pass generally reciprocal to the encoding pass described with respect to video encoder 2300 (FIG. 23).

Entropy decoding unit 2401 may retrieve an encoded bitstream. The encoded bitstream may include entropy coded video data (e.g., encoded blocks of video data). Entropy decoding unit 2401 may decode the entropy coded video data, and from the entropy decoded video data, motion compensation unit 2402 may determine motion information including motion vectors, motion vector precision, reference picture list indexes, and other motion information. Motion compensation unit 2402 may, for example, determine such information by performing the AMVP and merge mode.

Motion compensation unit 2402 may produce motion compensated blocks, possibly performing interpolation based on interpolation filters. Identifiers for interpolation filters to be used with sub-pixel precision may be included in the syntax elements.

Motion compensation unit 2402 may use interpolation filters as used by video encoder 2300 during encoding of the video block to calculate interpolated values for sub-integer pixels of a reference block. Motion compensation unit 2402 may determine the interpolation filters used by video encoder 2300 according to received syntax information and use the interpolation filters to produce predictive blocks.

Motion compensation unit 2402 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 2403 may use intra prediction modes for example received in the bitstream to form a prediction block from spatially adjacent blocks. Inverse quantization unit 2404 inverse quantizes, i.e., de-quantizes, the quantized video block coefficients provided in the bitstream and decoded by entropy decoding unit 2401. Inverse transform unit 2405 applies an inverse transform.

Reconstruction unit 2406 may sum the residual blocks with the corresponding prediction blocks generated by motion compensation unit 2402 or intra prediction unit 2403 to form decoded blocks. If desired, a deblocking filter may also be applied to filter the decoded blocks in order to remove blockiness artifacts. The decoded video blocks are then stored in buffer 2407, which provides reference blocks for subsequent motion compensation/intra prediction and also produces decoded video for presentation on a display device.

Figure 25:
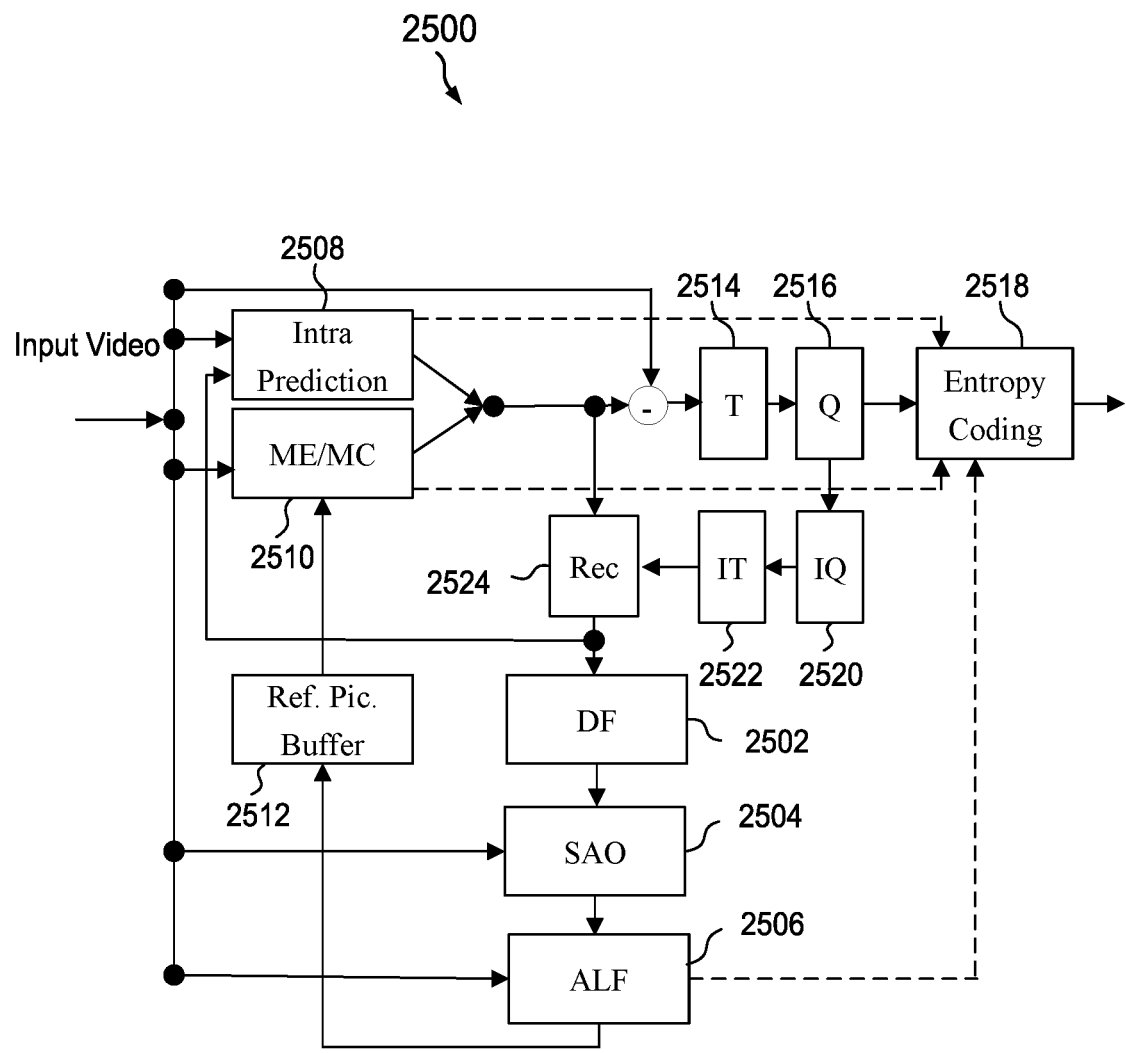
FIG. 25 is a schematic diagram of an example encoder.

FIG. 25 is a schematic diagram of an example encoder 2500. The encoder 2500 is suitable for implementing the techniques of VVC. The encoder 2500 includes three in-loop filters, namely a deblocking filter (DF) 2502, a sample adaptive offset (SAO) 2504, and an adaptive loop filter (ALF) 2506. Unlike the DF 2502, which uses predefined filters, the SAO 2504 and the ALF 2506 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 2506 is located at the last processing stage of each picture and can be regarded as a tool trying to catch and fix artifacts created by the previous stages.

The encoder 2500 further includes an intra prediction component 2508 and a motion estimation/compensation (ME/MC) component 2510 configured to receive input video. The intra prediction component 2508 is configured to perform intra prediction, while the ME/MC component 2510 is configured to utilize reference pictures obtained from a reference picture buffer 2512 to perform inter prediction. Residual blocks from inter prediction or intra prediction are fed into a transform (T) component 2514 and a quantization (Q) component 2516 to generate quantized residual transform coefficients, which are fed into an entropy coding component 2518. The entropy coding component 2518 entropy codes the prediction results and the quantized transform coefficients and transmits the same toward a video decoder (not shown). Quantization components output from the quantization component 2516 may be fed into an inverse quantization (IQ) components 2520, an inverse transform component 2522, and a reconstruction (REC) component 2524. The REC component 2524 is able to output images to the DF 2502, the SAO 2504, and the ALF 2506 for filtering prior to those images being stored in the reference picture buffer 2512.

A listing of solutions preferred by some examples is provided next. The following solutions show examples of techniques discussed herein.

1. A method of video processing (e.g., method 2100 depicted in FIG. 21), comprising: performing (2002) a conversion between a video block of a video and a bitstream of the video, wherein the video block has a size of W×H, and is partitioned into an extended ternary tree (ETT) partitioning according to a rule, wherein the ETT partitioning includes splitting the video block into three partitions of size W1×H1, W2×H2, W3×H3, where W1, W2, W3, H1, H2, H3 are integers and at least one of them is not in the form of power of 2.

2. The method of solution 1, wherein the rule specifies that W2 is not of a form W2=2N2 with any positive integer N2.

3. The method of any of solutions 1-2, wherein the rule specifies that H2 is not of a form H2=2N2 with any positive integer N2.

4. The method of any of solutions 1-3, wherein the rule specifies that the video block is split into partitions in a vertical direction.

5. The method of any of solutions 1-3, wherein the rule specifies that the video block is split into partitions in a horizontal direction.

6. The method of any of solutions 1-5, wherein the video block is partitioned into the ETT partitioning responsive to a dimension of the video block satisfying a condition.

7. The method of solution 6, wherein the condition is that either W or H or both are equal to an integer power of 2.

8. The method of any of solutions 1-7, wherein the rule specifies that two of the three partitions of the video block have a same partition size.

9. The method of any of solutions 1-8, wherein the rule specifies that all three partitions of the video block have a different partition size.

The following solutions show example embodiments of techniques discussed in the previous section.

10. The method of any of solutions 1-9, wherein the rule further specifies whether or how a first block corresponding to one of the three partitions generated from the video block is further split into additional smaller blocks based on a characteristic of the first block, wherein the characteristic includes an index of the first block or a size of the first block.

11. The method of solution 10, wherein the rule specifies that the first block is split into additional smaller blocks in case that the first block is a result of a horizontal or a vertical partitioning of the video block.

12. The method of solution 10, wherein the rule disallows some modes of splitting of the first block.

13. The method of solution 10 to 12, wherein the rule further specifies that the bitstream omits a codeword representing how the first block is split.

14. The method of solution 10, wherein the characteristic of the first block is based on a threshold.

15. The method of solution 14, wherein the threshold includes T1, and wherein, in case that a width of the first block is less than T1, then the first block is disallowed from further split into smaller additional blocks.

16. The method of solution 14 or 15, wherein the threshold includes T2, and wherein, in case that a height of the first block is less than T2, then the first block is disallowed from further split into smaller additional blocks.

17. The method of any of solutions 1-16, wherein the conversion includes generating the bitstream from the video.

18. The method of any of solutions 1-16, wherein the conversion includes generating the video from the bitstream.

19. A method of storing a bitstream on a computer-readable medium, comprising generating a bitstream according to a method recited in any one or more of solutions 1-17 and storing the bitstream on the computer-readable medium.

20. A computer-readable medium having a bitstream of a video stored thereon, the bitstream, when processed by a processor of a video decoder, causing the video decoder to generate the video.

21. A video decoding apparatus comprising a processor configured to implement a method recited in one or more of solutions 1 to 17.

22. A video encoding apparatus comprising a processor configured to implement a method recited in one or more of solutions 1 to 17.

23. A computer program product having computer code stored thereon, the code, when executed by a processor, causes the processor to implement a method recited in any of solutions 1 to 17.

24. A computer readable medium on which a bitstream complying to a bitstream format that is generated according to any of solutions 1 to 17.

25. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:
   determining, during a conversion between a current block of a picture of a video and a bitstream of the video, that an Extended Ternary-Tree (ETT) partitioning process is applied to the current block, wherein the ETT partitioning process splits the current block into three sub-blocks, and at least one of dimensions of at least one of the three sub-blocks is not a power-of-two number; and
   performing the conversion based on the determining;
   wherein an application of the ETT partitioning process to the current block is based on dimensions of the current block;
   wherein the current block includes a block width (W) and a block height (H), wherein the three sub-blocks include a first sub-block having a first width (W1) and a first height (H1), a second sub-block having a second width (W2) and a second height (H2), and a third sub-block having a third width (W3) and a third height (H3), and wherein W, W1, W2, W3, H, H1, H2, and H3 are all integers; and wherein at least one of dimensions of at least one of the three sub-blocks is a power-of-two number;
   wherein the ETT partitioning process comprises a vertical ETT (ETT-V) partitioning process in which the three sub-blocks have a collective width equal to the block width of the current block, and the three sub-blocks each have a height equal to the block height of the current block, wherein the first sub-block having a size of W1×H1, the second sub-block having a size of W2×H2, and the third sub-block having a size of W3×H3 are arranged in an order from left to right, wherein the three sub-blocks are coded in a coding order from left to right, wherein W1 is equal to W3 which is different from W2, and wherein W1 is equal to ⅛*W, W2 is equal to ¾*W, W3 is equal to ⅛*W; or
   wherein the ETT partitioning process comprises a horizontal ETT (ETT-H) partitioning process in which the three sub-blocks have a collective height equal to the block height of the current block, and wherein the three sub-blocks each have a width equal to the block width of the current block, wherein the first sub-block having a size of W1×H1, the second sub-block having a size of W2×H2, and the third sub-block having a size of W3×H3 are arranged in an order from top to bottom; wherein the three sub-blocks are coded in a coding order from top to bottom, wherein H1 is equal to H3 which is different from H2, and wherein H1 is equal to ⅛*H, H2 is equal to ¾*H, H3 is equal to ⅛*H.

2. The method of claim 1, wherein in a case that at least one of the dimensions of the current block is a power-of-two number, the ETT partitioning process is applied to the current block, and an indication for the ETT partitioning process or a type of the ETT partitioning process is included in the bitstream; and in a case that neither of the dimensions of the current block is a power-of-two number, the ETT partitioning process is not applied to the current block, and the indication for the ETT partitioning process or the type of the ETT partitioning process is not included in the bitstream.

3. The method of claim 1, further comprising:
determining whether a current sub-block of the three sub-blocks is further split according to a rule,
wherein the rule is associated with at least one of the ETT partitioning process of the current block, an index of the current sub-block, and a dimension of the current sub-block.

4. The method of claim 3, wherein the rule specifies that in a case that the current sub-block is split from the current block by a vertical ETT partitioning process or a horizontal ETT partitioning process and the index of the current sub-block is equal to 1, the current sub-block is further split.

5. The method of claim 3, wherein the rule specifies the current sub-block is further split in a case that the dimension of the current sub-block is larger than a threshold value or the current sub-block is a luma bock, and
wherein the threshold value is pre-defined or signalled in the bitstream.

6. The method of claim 3, wherein the rule specifies that in a case that the current sub-block is split from the current block by a vertical ETT partitioning process, and the index of the current sub-block is equal to 1, the current sub-block is not allowed to be further partitioned by a horizontal split,
in a case that the current sub-block is split from the current block by a horizontal ETT partitioning process, and the index of the current sub-block is equal to 1, the current sub-block is not allowed to be further partitioned by a vertical split,
in a case that the current block exceeds a right boundary of the picture, the current sub-block is not allowed to be further partitioned by the horizontal split, and
in a case that the current block exceeds a bottom boundary of the picture, the current sub-block is not allowed to be further partitioned by the vertical split.

7. The method of claim 3, wherein the rule specifies that in a case that the current sub-block is split from the current block by a vertical ETT partitioning process and the index of the current sub-block is equal to 1, the current sub-block is further split vertically into two child blocks and widths of the two child blocks are different;
in a case that the current sub-block is split from the current block by a horizontal ETT partitioning process, and the index of the current sub-block is equal to 1, the current sub-block is further split horizontally into two child blocks and heights of the two child blocks are different, and
wherein dimensions of the two child blocks are power-of-two numbers.

8. The method of claim 3, wherein the rule specifies that in a case that the current block exceeds a right boundary of the picture, the current sub-block is further split vertically into two child blocks, and
in a case that the current block exceeds a bottom boundary of the picture, the current sub-block is further split horizontally into two child-blocks.

9. The method of claim 1, wherein in a case that a codeword for the ETT partitioning process is not signaled in a bitstream, the codeword is inferred to a predefined value.

10. The method of claim 1, wherein the conversion includes encoding the current block into the bitstream.

11. The method of claim 1, wherein the conversion includes decoding the current block from the bitstream.

12. An apparatus for processing video data comprising a processor and a non-transitory memory with instructions thereon, wherein the instructions upon execution by the processor, cause the processor to:
determine, during a conversion between a current block of a picture of a video and a bitstream of the video, that an Extended Ternary-Tree (ETT) partitioning process is applied to the current block, wherein the ETT partitioning process splits the current block into three sub-blocks, and at least one of dimensions of at least one of the three sub-blocks is not a power-of-two number; and
perform the conversion based on the determining;
wherein an application of the ETT partitioning process to the current block is based on dimensions of the current block;
wherein the current block includes a block width (W) and a block height (H), wherein the three sub-blocks include a first sub-block having a first width (W1) and a first height (H1), a second sub-block having a second width (W2) and a second height (H2), and a third sub-block having a third width (W3) and a third height (H3), and wherein W, W1, W2, W3, H, H1, H2, and H3 are all integers; and wherein at least one of dimensions of at least one of the three sub-blocks is a power-of-two number;
wherein the ETT partitioning process comprises a vertical ETT (ETT-V) partitioning process in which the three sub-blocks have a collective width equal to the block width of the current block, and the three sub-blocks each have a height equal to the block height of the current block, wherein the first sub-block having a size of W1×H1, the second sub-block having a size of W2×H2, and the third sub-block having a size of W3×H3 are arranged in an order from left to right, wherein the three sub-blocks are coded in a coding order from left to right, wherein W1 is equal to W3 which is different from W2, and wherein W1 is equal to ⅛*W, W2 is equal to ¾*W, W3 is equal to ⅛*W; or
wherein the ETT partitioning process comprises a horizontal ETT (ETT-H) partitioning process in which the three sub-blocks have a collective height equal to the block height of the current block, and wherein the three sub-blocks each have a width equal to the block width of the current block, wherein the first sub-block having a size of W1×H1, the second sub-block having a size of W2×H2, and the third sub-block having a size of W3×H3 are arranged in an order from top to bottom; wherein the three sub-blocks are coded in a coding order from top to bottom, wherein H1 is equal to H3 which is different from H2, and wherein H1 is equal to ⅛*H, H2 is equal to ¾*H, H3 is equal to ⅛*H.

13. A method for storing a bitstream of a video, comprising:
determining, for a current block of a picture of the video, that an Extended Ternary-Tree (ETT) partitioning process is applied to the current block, wherein the ETT partitioning process splits the current block into three sub-blocks, and at least one of dimensions of at least one of the three sub-blocks is not a power-of-two number;
generating the bitstream based on the determining; and
storing the bitstream in a non-transitory computer-readable recording medium, wherein an application of the ETT partitioning process to the current block is based on dimensions of the current block;

wherein the current block includes a block width (W) and a block height (H), wherein the three sub-blocks include a first sub-block having a first width (W1) and a first height (H1), a second sub-block having a second width (W2) and a second height (H2), and a third sub-block having a third width (W3) and a third height (H3), and wherein W, W1, W2, W3, H, H1, H2, and H3 are all integers; and wherein at least one of dimensions of at least one of the three sub-blocks is a power-of-two number;

wherein the ETT partitioning process comprises a vertical ETT (ETT-V) partitioning process in which the three sub-blocks have a collective width equal to the block width of the current block, and the three sub-blocks each have a height equal to the block height of the current block, wherein the first sub-block having a size of W1×H1, the second sub-block having a size of W2×H2, and the third sub-block having a size of W3×H3 are arranged in an order from left to right, wherein the three sub-blocks are coded in a coding order from left to right, wherein W1 is equal to W3 which is different from W2, and wherein W1 is equal to ⅛*W, W2 is equal to ¾*W, W3 is equal to ⅛*W; or wherein the ETT partitioning process comprises a horizontal ETT (ETT-H) partitioning process in which the three sub-blocks have a collective height equal to the block height of the current block, and wherein the three sub-blocks each have a width equal to the block width of the current block, wherein the first sub-block having a size of W1×H1, the second sub-block having a size of W2×H2, and the third sub-block having a size of W3×H3 are arranged in an order from top to bottom; wherein the three sub-blocks are coded in a coding order from top to bottom, wherein H1 is equal to H3 which is different from H2, and wherein H1 is equal to ⅛*H, H2 is equal to ¾*H, H3 is equal to ⅛*H.

* * * * *